US011561592B2

(12) United States Patent
Moritomo et al.

(10) Patent No.: US 11,561,592 B2
(45) Date of Patent: Jan. 24, 2023

(54) POWER RECEIVING APPARATUS AND CONTROL METHOD

(71) Applicant: CANON KABUSHIKI KAISHA, Tokyo (JP)

(72) Inventors: Hiroshi Moritomo, Tokyo (JP); Kento Inai, Kanagawa (JP); Yuki Nogawa, Tokyo (JP); Takuma Iwagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/307,874

(22) Filed: May 4, 2021

(65) Prior Publication Data
US 2021/0349511 A1 Nov. 11, 2021

(30) Foreign Application Priority Data

May 8, 2020 (JP) .............................. JP2020-082812
May 8, 2020 (JP) .............................. JP2020-082813

(Continued)

(51) Int. Cl.
*G06F 1/26* (2006.01)
*G06F 21/44* (2013.01)
(Continued)

(52) U.S. Cl.
CPC ............ *G06F 1/26* (2013.01); *G06F 13/4282* (2013.01); *G06F 21/44* (2013.01);
(Continued)

(58) Field of Classification Search
CPC ... G06F 1/26; G06F 1/266; G06F 1/28; G06F 13/4282; G06F 21/44; G06F 21/81;
(Continued)

(56) References Cited

U.S. PATENT DOCUMENTS 6,429,622 B1 * 8/2002 Svensson .............. H01M 10/46
320/106
8,179,087 B2 * 5/2012 Neumiller ............ A61N 1/3975
607/60
(Continued)

FOREIGN PATENT DOCUMENTS

JP 2018-097643 A 6/2018

OTHER PUBLICATIONS

"USB Power Delivery Changes the Game". White Paper. Jan. 2019. Renesas. (Year: 2019).*
(Continued)

*Primary Examiner* — Thomas J. Cleary
(74) *Attorney, Agent, or Firm* — Canon U.S.A., Inc. IP Division

(57) ABSTRACT

A power receiving apparatus includes a power receiving unit and a control unit. The power receiving unit receives a first power from a power supply apparatus via a connection unit. The control unit determines whether or not authentication information including identification information of the power supply apparatus is authentic, and determines whether or not the power supply apparatus has passed a compliance test based on the identification information. The power receiving unit is allowed to receive a second power greater than the first power, in a case where the authentication information is authentic and the power supply apparatus has passed the compliance test.

11 Claims, 13 Drawing Sheets

(30) Foreign Application Priority Data

May 8, 2020 (JP) .............................. JP2020-082814
May 8, 2020 (JP) .............................. JP2020-082815

(51) Int. Cl.
*G06F 13/42* (2006.01)
*H02J 7/00* (2006.01)

(52) U.S. Cl.
CPC .. *H02J 7/00045* (2020.01); *G06F 2213/0042* (2013.01); *H02J 7/00034* (2020.01); *H02J 7/0068* (2013.01); *H02J 2310/22* (2020.01)

(58) Field of Classification Search
CPC .............. G06F 21/85; G06F 2213/0042; H02J 7/00045; H02J 7/00034; H02J 7/0068; H02J 2310/22
See application file for complete search history.

(56) References Cited

U.S. PATENT DOCUMENTS

| | | | | |
|---|---|---|---|---|
| 10,073,990 | B1* | 9/2018 | Shieh | G06F 1/26 |
| 2006/0149966 | A1* | 7/2006 | Buskey | H04L 9/3271 713/168 |
| 2007/0143864 | A1* | 6/2007 | Cabana | H01M 10/42 726/36 |
| 2007/0192877 | A1* | 8/2007 | Yoo | H01M 10/42 726/34 |
| 2007/0260892 | A1* | 11/2007 | Paul | H02J 7/00036 713/193 |
| 2007/0278992 | A1* | 12/2007 | Paul | H02J 7/00047 320/107 |
| 2008/0007647 | A1* | 1/2008 | Masuda | H04N 5/225 348/372 |
| 2009/0256717 | A1* | 10/2009 | Iwai | G06F 1/26 700/295 |
| 2010/0198287 | A1* | 8/2010 | Neumiller | H02J 7/02 607/5 |
| 2010/0262312 | A1* | 10/2010 | Kubota | H02J 3/381 713/340 |
| 2011/0221604 | A1* | 9/2011 | Johnson | H02J 7/007 182 320/162 |
| 2012/0030480 | A1* | 2/2012 | Ikeuchi | H01M 10/4221 713/189 |
| 2012/0072042 | A1* | 3/2012 | Moriai | G06F 21/445 700/297 |
| 2014/0125312 | A1* | 5/2014 | Mullins | G06F 21/44 324/71.1 |
| 2015/0188346 | A1* | 7/2015 | Oku | H02J 7/007 320/138 |
| 2015/0280475 | A1* | 10/2015 | Li | G06F 13/4059 320/107 |
| 2016/0294206 | A1* | 10/2016 | Okawa | H02J 7/00047 |
| 2017/0103197 | A1* | 4/2017 | Degura | G06F 1/26 |
| 2019/0212795 | A1* | 7/2019 | Moritomo | G06F 1/26 |
| 2019/0280510 | A1* | 9/2019 | Sato | G06F 9/3004 |
| 2019/0312462 | A1* | 10/2019 | Shichino | H02J 50/80 |
| 2021/0057925 | A1* | 2/2021 | Komoriya | H02J 50/10 |
| 2021/0159737 | A1* | 5/2021 | Shichino | H02J 7/00045 |
| 2021/0397236 | A1* | 12/2021 | Enomoto | H02J 1/06 |
| 2021/0406360 | A1* | 12/2021 | Kitanosako | G06F 21/85 |
| 2022/0043074 | A1* | 2/2022 | Inoue | G01R 31/58 |
| 2022/0057821 | A1* | 2/2022 | Sekimoto | G01R 31/40 |
| 2022/0115866 | A1* | 4/2022 | Fujisaki | H02J 7/00034 |
| 2022/0138308 | A1* | 5/2022 | Moritomo | G06F 21/81 713/300 |
| 2022/0164432 | A1* | 5/2022 | Moritomo | G06F 13/382 |

OTHER PUBLICATIONS

"Universal Serial BusType-C™ Authentication Specification". Release 1.0 with ECN and Errata. Jan. 7, 2019. USB 3.0 Promoter Group. (Year: 2019).*

* cited by examiner

F I G. 5A

| XID | USB COMPLIANCE INFORMATION | Version | EXTENSION REGION |
|---|---|---|---|
| 0x1234_5678 | OK | 1.0 | |
| 0x9ABC_DEF0 | NG | 2.0 | |
| 0x3456_ABCD | TEST IN PROGRESS | 0.1 | |
| 0x789A_1234 | OK | 1.0 | NG |

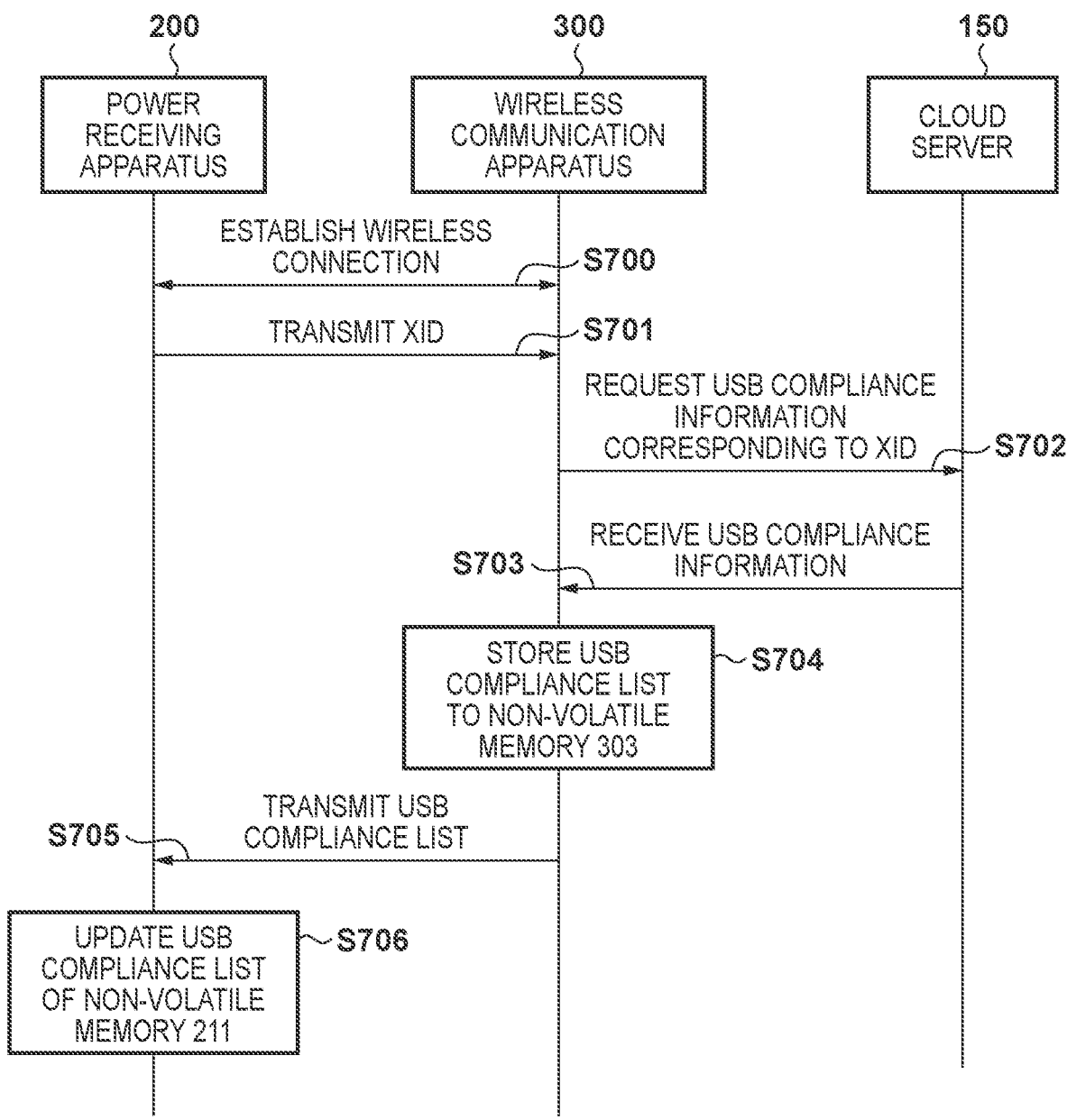

| XID | USB COMPLIANCE INFORMATION | Version | EXTENSION REGION |
|---|---|---|---|
| 0x1234_5678 | OK | 1.0 | |
| 0x9ABC_DEF0 | NG | 2.0 | |
| 0x3456_ABCD | TEST IN PROGRESS | 0.1 | |
| 0x789A_1234 | OK | 1.0 | NG |
| 0x5678_ABCD | Unknown | 0 | |

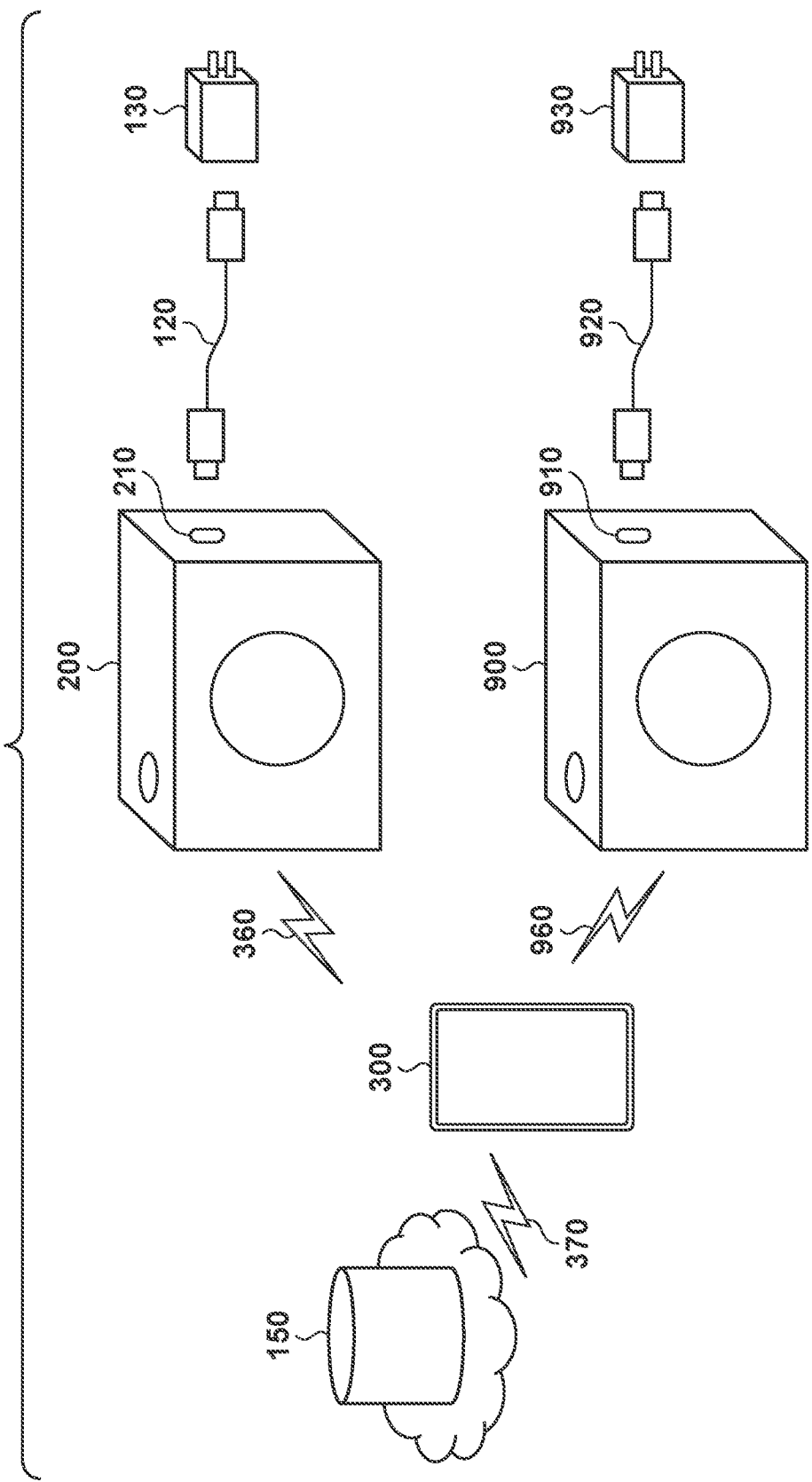

POWER RECEIVING APPARATUS AND CONTROL METHOD

BACKGROUND

Field of the Disclosure

Aspects of the disclosure generally relate to a power receiving apparatus, and a method for controlling a power receiving apparatus.

Description of the Related Art

In recent years, as a wired interface for communication used in electronic devices such as digital cameras, there is an interface such as universal serial bus (USB), which is capable of transmitting power in parallel with data transfer. USB is a standard established by the USB Implementers Forum, Inc. (USB-IF), a nonprofit organization that promotes the USB standard. The USB-IF also certifies compliance of an electronic device to the USB standard.

The USB-IF has also established various USB-related standards, one such standard being USB Power Delivery (USB PD). With the USB PD standard, a large amount of power, a maximum of 100 W, can be supplied from a power supply apparatus, such as a USB host controller or an AC adapter, to a power receiving apparatus connected via a USB cable. With the increase in power transmitted between connected apparatuses, demand has increased for safety improvements.

Relating to this demand for improved safety, a USB AUTH (USB Authentication) standard has been established that enables an authentication communication between connected apparatuses to determine whether or not the apparatuses can trust one another. According to the USB AUTH standard, each electronic device internally stores a certificate issued from the USB-IF as electronic information. Authentication can be performed by transmitting and receiving the certificates between the apparatuses via communication encrypted by a predetermined process.

Japanese Patent Laid-Open No. 2018-097643 describes technology for safety control using authentication communication in accordance with USB AUTH standard. In Japanese Patent Laid-Open No. 2018-097643, technology is described that relates to a power supply apparatus configured to perform USB AUTH communications via a USB cable connecting apparatuses and control power supplied according to an authentication result.

A certificate required for authentication via USB AUTH communication can be received from the USB-IF even in a case where the electronic device or USB cable has not passed the compliance test for testing compliance with the USB standard. Thus, authentication via USB AUTH communication does not mean that the electronic device and USB cable are compliant with the USB standard.

For the above reason, in a case where a power receiving apparatus receives a power supply from a power supply apparatus authenticated via USB AUTH communication, it cannot be assumed that the power supply apparatus is compliant with the USB standard. Thus, a possibility exists that, when power is controlled based on the result of authentication via USB AUTH communication, the power receiving apparatus may receive a large amount of power from a non-USB-standard-compliant power supply apparatus.

Similarly, in a case where a power receiving apparatus performs authentication of a power supply apparatus via USB AUTH communication and receives a power supply from a power supply apparatus authenticated via USB AUTH communication, it cannot be assumed that the power supply apparatus is compliant with the USB standard. Thus, the power receiving apparatus must determine whether or not the power supply apparatus passes the compliance test. The power receiving apparatus can perform different operations depending on the USB AUTH authentication result or the pass/failure determination result of the compliance test. However, the user is not easily informed of the authentication result or the determination result.

SUMMARY

According to various embodiments, a power receiving apparatus can safely receive power supplied from a power supply apparatus.

According to various embodiments, there is provided a power receiving apparatus that includes a power receiving unit that receives a first power from a power supply apparatus via a connection unit; and a control unit that determines whether or not authentication information including identification information of the power supply apparatus is authentic, and determines whether or not the power supply apparatus has passed a compliance test based on the identification information, wherein the power receiving unit is allowed to receive a second power greater than the first power, in a case where the authentication information is authentic and the power supply apparatus has passed the compliance test.

According to various embodiments, there is provided a method that includes causing a power receiving unit to receive a first power from a power supply apparatus via a connection unit; determining whether or not authentication information including identification information of the power supply apparatus is authentic; determining whether or not the power supply apparatus has passed a compliance test based on the identification information; and allowing the power receiving unit to receive a second power greater than the first power, in a case where the authentication information is authentic and the power supply apparatus has passed the compliance test.

Further features of various embodiments will become apparent from the following description of exemplary embodiments.

BRIEF DESCRIPTION OF THE DRAWINGS

FIG. 5A is a diagram for describing an example of a USB compliance list (compliance management information).

FIG. 7 is a sequence chart for describing a process of updating a USB compliance list according to a third embodiment.

FIG. 9 is a diagram for describing an example of sharing a USB compliance list.

DESCRIPTION OF THE EMBODIMENTS

Exemplary embodiments, features, and aspects of the disclosure will be described below with reference to the drawings. However, aspects of the disclosure are not limited to the following embodiments. Note that in the attached drawings, the same or equivalent components are denoted with the same reference number, and redundant descriptions will be omitted.

First Embodiment

Figure 1:
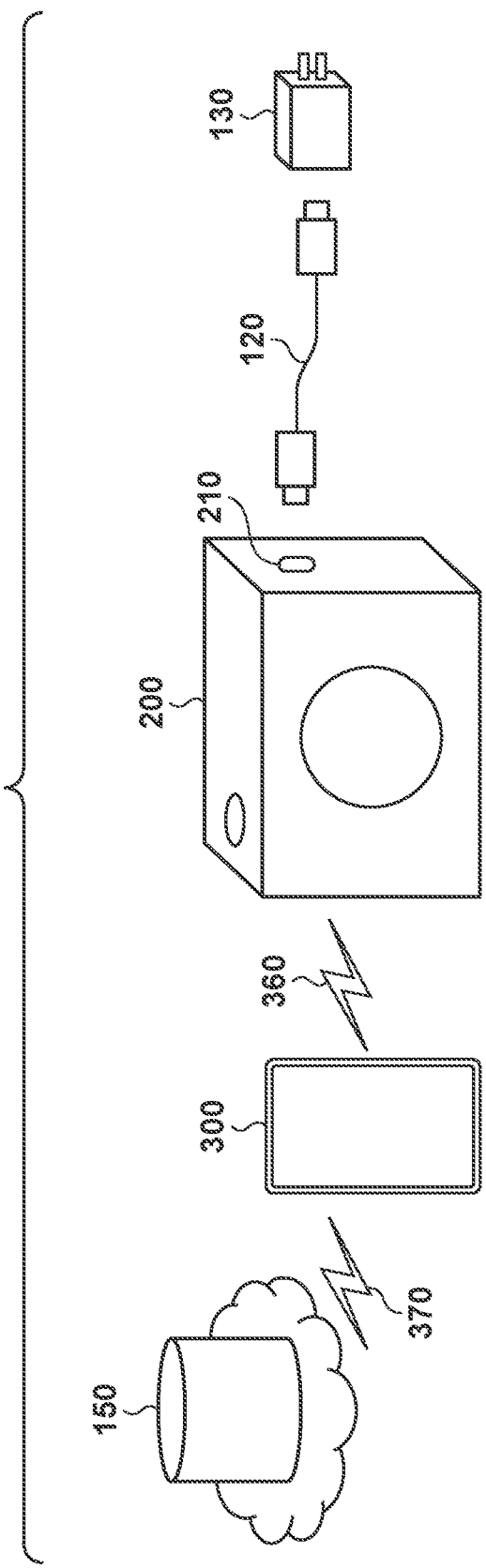
FIG. 1 is a diagram for describing a system configuration.

FIG. 1 is a diagram for describing a system configuration according to a first embodiment. In FIG. 1, 200 denotes a power receiving apparatus, which is an electronic device. The first embodiment is described using a digital camera as an example of a power receiving apparatus. However, the power receiving apparatus of the first embodiment is not limited to a digital camera, and the first embodiment is applicable to various power receiving apparatuses.

210 denotes a connection unit that connects the power receiving apparatus 200 to an external apparatus. The first embodiment is described using a USB Type-C connector as an example. The connection unit 210 (interface) is configured to perform data communication and receive power based on the USB Power Delivery (USB PD) standard.

120 denotes a cable. The first embodiment is described using a USB cable as an example. In a case where an external apparatus is connected to the connection unit 210 via the cable 120, the power receiving apparatus 200 is capable of receiving power from the external apparatus and performing data communication with the external apparatus.

130 denotes a power supply apparatus, which is an external apparatus. This embodiment is described using an AC adapter as an example. However, the power supply apparatus 130 may be another electronic device or the like with a mobile battery or power supply.

300 denotes a portable wireless communication apparatus, which is an external apparatus. The first embodiment is described using a smart phone as an example. However, the wireless communication apparatus 300 may be another electronic device such as a personal computer (PC) or the like.

360 denotes a wireless communication medium compliant with a communication standard, such as Wi-Fi (registered trademark) or Bluetooth (registered trademark), for example. The wireless communication apparatus 300 is connected to the power receiving apparatus 200 via the wireless communication medium 360. This connection allows the wireless communication apparatus 300 to view recorded images and live view images in the digital camera, i.e., the power receiving apparatus 200, control camera image capturing, for example. 370 denotes a wireless communication medium compliant with a communication standard, such as 4G or 5G, for example. The wireless communication apparatus 300 is capable of WEB access via the wireless communication medium 370. The first embodiment is described using an example in which the power receiving apparatus 200 and the wireless communication apparatus 300 are connected via the wireless communication medium 360. However, the communication between the power receiving apparatus 200 and the wireless communication apparatus 300 is not limited to wireless communication and may be wired communication.

150 denotes a cloud server, which is an external apparatus. The wireless communication apparatus 300 is capable of accessing the cloud server 150 via the wireless communication medium 370. Information in which an XID and USB compliance information are associated together (referred to as a USB compliance list) is stored in the cloud server 150. XID is product unique identification information held by an electronic device or cable that supports the USB standard (collectively referred to as "USB product" below). In this embodiment, an XID being "product unique" means that an XID is allocated to the USB product per model number. Thus, USB products of the same model number have the same XID. USB compliance information is information indicating whether or not a USB product passed the USB standard compliance test (or whether or not the test is currently in progress). Passing the compliance test is equivalent to being certified of USB standard compliance. This is important for ensuring connection compatibility.

Figure 2:
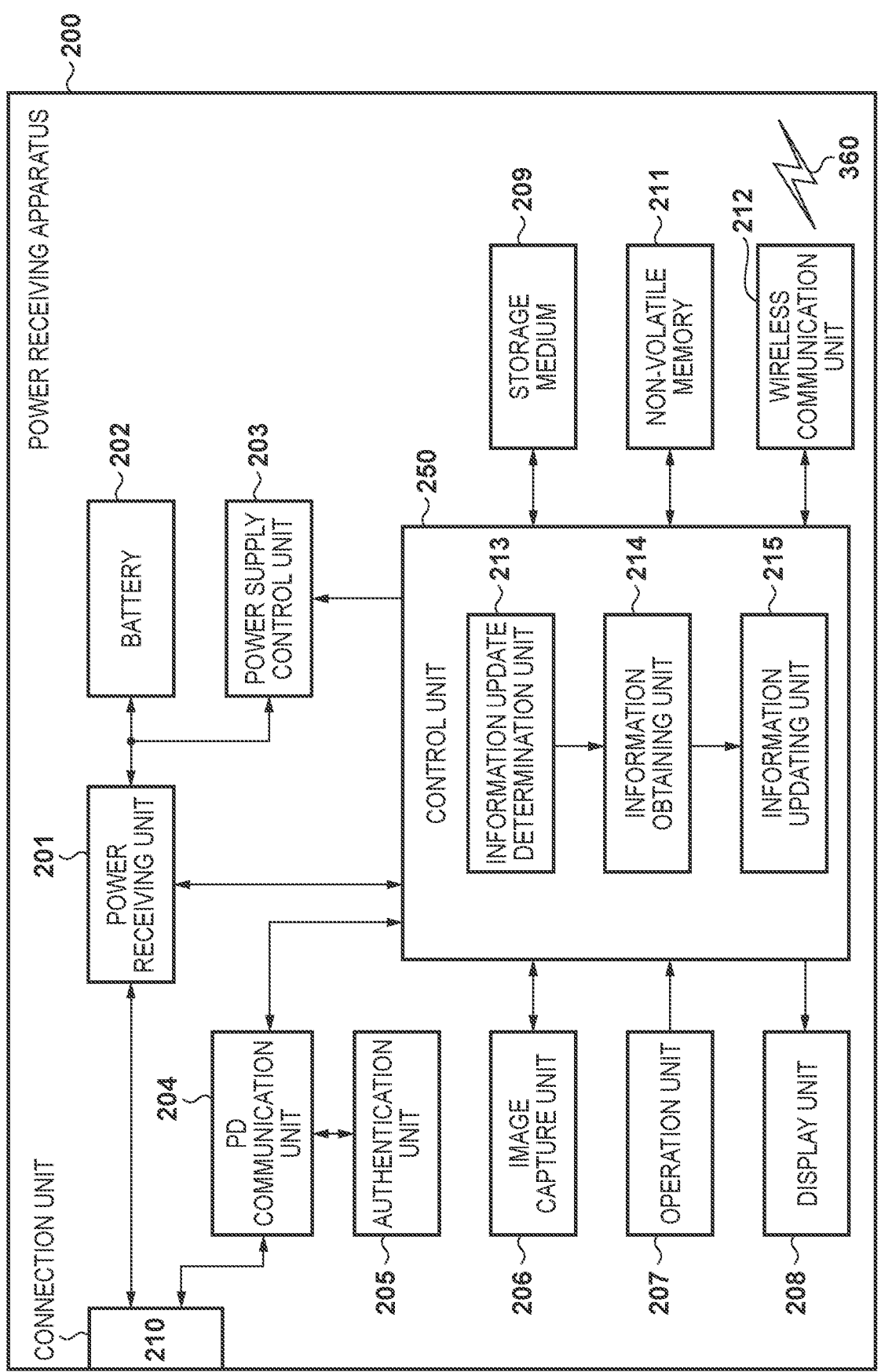
FIG. 2 is a block diagram for describing components of a power receiving apparatus 200.

FIG. 2 is a block diagram for describing components of the power receiving apparatus 200. In FIG. 2, the connection unit 210 is a USB Type-C connector, for example, as described using FIG. 1. 201 denotes a power receiving unit connected to a power supply terminal (for example, a VBUS terminal) of the connection unit 210 that controls power supplied from the power supply apparatus 130 illustrated in FIG. 1 via the cable 120. 202 denotes a battery, such as a lithium ion battery or the like. The power receiving unit 201 includes a DC/DC converter and a charging circuit, and is configured to charge the battery 202 using power received via the connection unit 210.

203 denotes a power supply control unit including a DC/DC converter or the like that supplies power to the various circuits in the power receiving apparatus 200 using power from the power receiving unit 201 or the battery 202. 204 denotes a PD communication unit connected to a communication terminal (for example, a CC terminal) of the connection unit 210 that performs data communication with the IC installed in the power supply apparatus 130 and the cable 120 illustrated in FIG. 1 using the USB PD standard (a predetermined power supply standard). The PD communication unit 204 determines whether or not the connected power supply apparatus 130 and the cable 120 support the USB PD standard. The power receiving apparatus 200 performs negotiation communication based on a communication protocol compliant with the USB PD standard via the PD communication unit 204 and sends a request to the power supply apparatus 130 for a desired power supply.

205 denotes an authentication unit that, for example, includes a security chip. The authentication unit 205 includes a built-in non-volatile memory and stores in advance electronic information of a certificate issued from the USB-IF. The PD communication unit 204 performs communication compliant with the USB PD standard, receives electronic information including the encrypted certificate from the power supply apparatus 130 and the cable 120, and transmits this to the authentication unit 205. The authentication unit 205 performs an authentication (a first authentication) to determine whether or not the connected power supply apparatus 130 and the cable 120 are trusted by the USB-IF by decoding the electronic information sent from the PD communication unit 204 via a predetermined process compliant with the USB AUTH standard (a predetermined authentication standard). Also, the authentication unit 205 obtains the XID of both the power supply apparatus 130 and the cable 120 by decoding the electronic information of the power supply apparatus 130 and the cable 120 sent from the PD communication unit 204.

206 denotes an image capture unit that includes an image capture lens for zooming and focusing on a subject image, an image sensor that converts the subject image into electrical image information. The image information obtained by the image capture unit 206 undergoes image processing such as compression at a control unit 250 and is then stored in a storage medium 209.

207 denotes an operation unit including a button, touch panel, or the like that is used by a user to operate the power receiving apparatus 200.

208 denotes a display unit including an LCD or the like that is used to display the state of the digital camera, i.e., the power receiving apparatus 200, display an image or the like.

209 denotes a storage medium, such as a memory card, a hard disk, or the like.

211 denotes a non-volatile memory including a NOR flash memory, a NAND flash memory, or the like that is used to store control programs and image data of the power receiving apparatus 200. The non-volatile memory 211 may be a detachable configuration such as a SD card. In this embodiment, the non-volatile memory 211 is used to store the USB compliance list in which the XID and the USB compliance information are associated together. For example, the USB compliance list is stored in advance in the non-volatile memory 211 before shipping the power receiving apparatus 200. Alternatively, the power receiving apparatus 200 may obtain the USB compliance list from the cloud server 150 via the wireless communication apparatus 300 in accordance with a user operation and store the USB compliance list in the non-volatile memory 211. Also, the power receiving apparatus 200 is capable of updating the USB compliance list stored in the non-volatile memory 211. Control relating to updating the USB compliance list will be described below.

212 denotes a wireless communication unit compliant with Wi-Fi (registered trademark), Bluetooth (registered trademark), or the like that is used for data communication with an external apparatus. The wireless communication unit 212 (an interface capable of data communication) is used for data communication with the wireless communication apparatus 300 via the wireless communication medium 360, as described using FIG. 1.

250 denotes a control unit that controls the entire power receiving apparatus 200. The control unit 250 includes a built-in microprocessor and RAM, for example, and controls the operations of the entire power receiving apparatus 200 by loading a control program stored in advance in the non-volatile memory 211 on the RAM and executing the control program. Herein, control program refers to a program for controlling the various flowcharts described below of the first embodiment. Also, the control unit 250 is configured to determine that the power supply apparatus 130 and the cable 120 are connected to the connection unit 210 via the power receiving unit 201 and the PD communication unit 204.

213 denotes an information update determination unit for updating the USB compliance list in which the XID and the USB compliance information are associated together. For example, the information update determination unit 213 determines to update the USB compliance list in accordance with the control unit 250 determining that the power supply apparatus 130 and the cable 120 are connected to the connection unit 210. However, no such limitation is intended, and the information update determination unit 213 is required to update the USB compliance list as appropriate when the USB compliance list can be obtained from an external apparatus. For example, the information update determination unit 213 may determine to update the USB compliance list when it is determined that an external apparatus has been connected to via the wireless communication unit 212, when a predetermined input is performed by a user using the operation unit 207 or the like.

214 denotes an information obtaining unit that, when it is determined that the USB compliance list is to be updated by the information update determination unit 213, performs control to obtain the USB compliance list from the connected external apparatus via wired or wireless data communication. The information obtaining unit 214, for example, obtains the USB compliance list from the external apparatus connected via the connection unit 210 using communication compliant with the USB standard. In another example, the information obtaining unit 214 may use the wireless communication unit 212 to connect to an external apparatus or the cloud server 150 via wireless communication and obtain the USB compliance list or may obtained the USB compliance list stored in the storage medium 209.

215 denotes an information updating unit that receives the USB compliance list obtained from the information obtaining unit 214, determines whether or not to update the USB compliance list already stored in the non-volatile memory 211, and perform an update process. The information updating unit 215 will be described in detail below.

Figure 3:
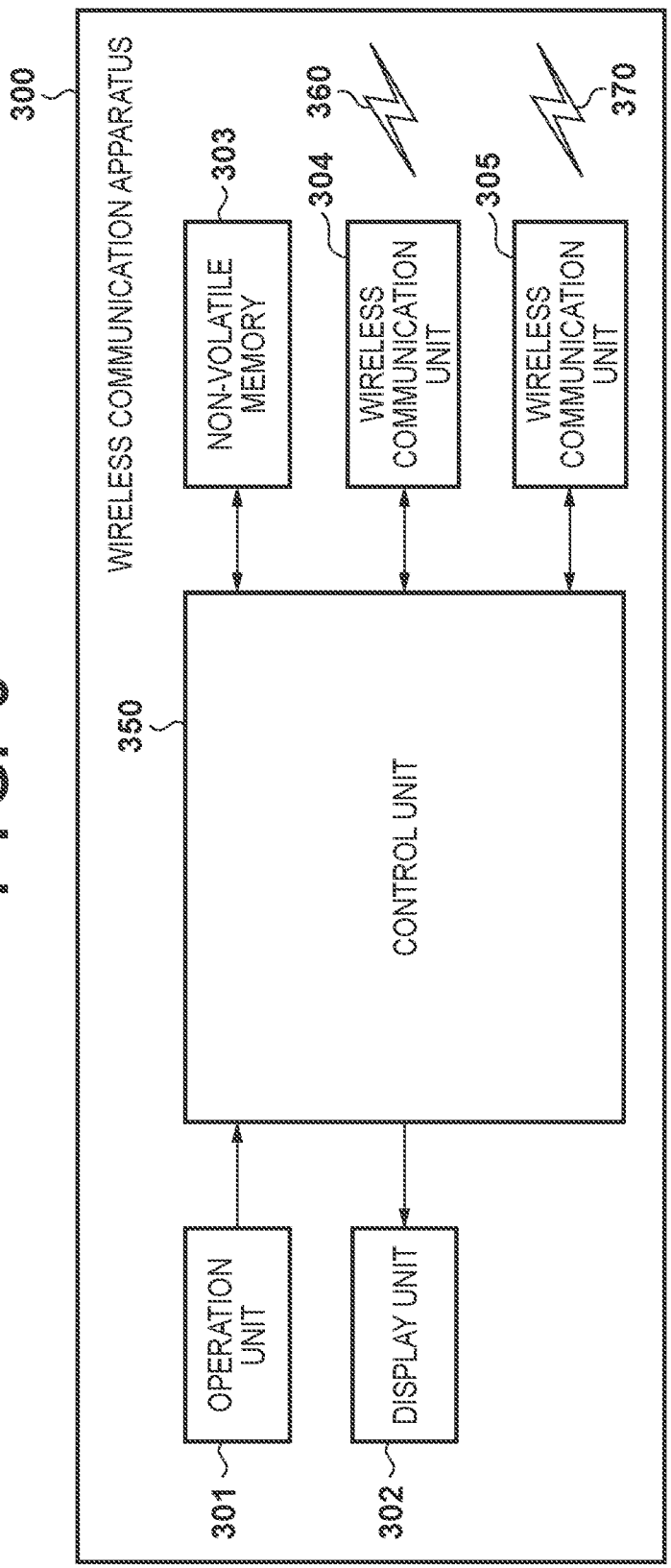
FIG. 3 is a block diagram for describing components of a wireless communication apparatus 300.

FIG. 3 is a block diagram for describing components of the wireless communication apparatus 300. 301 denotes an operation unit including a button, touch panel, or the like that is used by a user to operate the wireless communication apparatus 300. As described using FIG. 1, operations that can be performed include image capture control of the power receiving apparatus 200, image viewing, or the like.

302 denotes a display unit including an LCD or the like that is used to display the state of the wireless communication apparatus 300, display an image or the like. This allows the user to view images of the power receiving apparatus 200, check live view images or the like.

303 denotes a non-volatile memory including a NOR flash memory, a NAND flash memory, or the like that is used to store programs and image data of the wireless communication apparatus 300. A non-volatile memory 303 is used to store the USB compliance list in which the XID and the USB compliance information are associated together. Note that the non-volatile memory 303 may be a detachable configuration such as a SD card.

304 denotes a wireless communication unit compliant with Wi-Fi (registered trademark), Bluetooth (registered trademark), or the like that is used for data communication with an external device. As described using FIG. 1, the wireless communication unit 304 is used for data communication with the power receiving apparatus 200.

305 denotes a wireless communication unit for mobile communication compliant with a standard, such as 4G or 5G, that is used for not audio data for calls, but also for WEB access via high speed data communication. As described using FIG. 1, the wireless communication apparatus 300 uses the wireless communication unit 305 when accessing the cloud server 150 on the WEB.

Figure 4A:
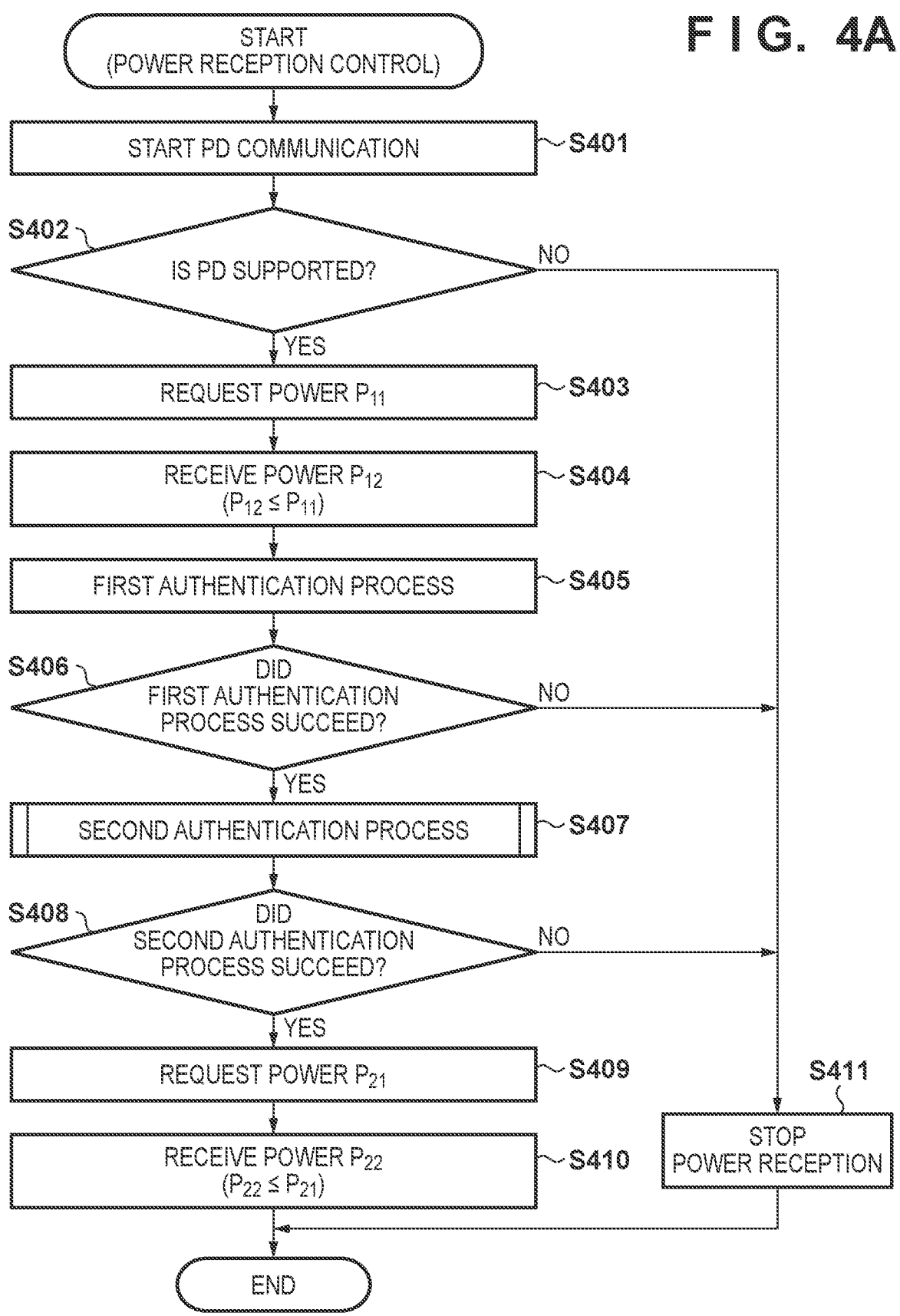
FIG. 4A is a flowchart for describing a power reception control according to a first embodiment.

FIG. 4A is a flowchart for describing a power reception control in the first embodiment. When the control unit 250 detects that the power supply apparatus 130 has connected to the connection unit 210 via the cable 120, the flowchart starts.

In step S401, the PD communication unit 204 starts receiving and transmitting information with the power supply apparatus 130 using the USB PD standard communication protocol.

In step S402, the PD communication unit 204 determines whether or not the power supply apparatus 130 supports the USB PD standard. In a case where the power supply apparatus 130 supports the USB PD standard, the process proceeds from step S402 to step S403. In a case where the power supply apparatus 130 does not support the USB PD standard, the process proceeds from step S402 to step S411.

Here, the PD communication unit 204 determines whether or not the power supply apparatus 130 supports the PD standard depending on whether or not communication has been received from the power supply apparatus 130 using the USB PD standard communication protocol. In a case where communication using the USB PD standard communication protocol has been properly received within a predetermined time period, the PD communication unit 204 determines that the power supply apparatus 130 supports the USB PD standard. On the other hand, in a case where communication using the USB PD standard communication protocol has not been properly received or has not been received within a predetermined time period, the PD communication unit 204 determines that the power supply apparatus 130 does not support the USB PD standard. The predetermined time period is required to be a time period compliant with the USB PD standard and may be a time period of 310 ms, for example. Also, communication using the USB PD standard communication protocol refers to Source Capability Message communication including information of the power able to be supplied to the power supply apparatus 130. In the first embodiment, for example, communication from the power supply apparatus 130 includes power information indicating that 2.5 W (5 V, 500 mA), 15 W (5 V, 3 A), 27 W (9 V, 3 A), and 30W (15 V, 2 A) power can be supplied.

In step S403, the PD communication unit 204 transmits and receives information using the USB PD standard communication protocol and sends a request for a supply of power P11 to the power supply apparatus 130. Here, the power P11 is required to be the minimum amount of power required for the power receiving apparatus 200 to perform a first authentication process of step S405 and a second authentication process of step S407. Also, the power P11 is determined by being selected from the information of power able to be supplied by the power supply apparatus 130 received in step S402. In the first embodiment, for example, the power P11 is 2.5 W (5 V, 500 mA).

In step S404, the power receiving unit 201 performs control such that a power P12 (first power) received from the power supply apparatus 130 does not exceed the power P11 based on control from the control unit 250. In the first embodiment, the power receiving unit 201 controls the current value of power received from the power supply apparatus 130 to be 500 mA or less so that the power P12 (the first power) does not exceed the power P11. Here, the power receiving unit 201 uses the supplied power P12 to supply the necessary power to the components of the power receiving apparatus 200, for the power receiving apparatus 200 to perform the first authentication process of step S405 and the second authentication process of step S407. Also, to ensure that there is sufficient power for the first authentication process and the second authentication process, components of the power receiving apparatus 200 that are not involved in the first authentication process and the second authentication process may be restricted in operation to reduce power consumption.

In step S405, the power receiving apparatus 200 performs the first authentication process on both the power supply apparatus 130 and the cable 120 connected to the power receiving apparatus 200 to confirm that the power supply apparatus 130 and the cable 120 are trusted by the USB-IF. The first authentication process includes transmitting and receiving information compliant with the USB PD standard by the PD communication unit 204 and performing a process compliant with the USB AUTH standard by the authentication unit 205.

The first authentication process on the power supply apparatus 130 will now be described in detail. The PD communication unit 204 receives predetermined authentication information from the power supply apparatus 130 using the USB AUTH standard communication protocol. The predetermined authentication information is electronic information of the encrypted certificate issued by the USB-IF. In a case where the PD communication unit 204 has not properly received the predetermined authentication information within the predetermined time period, the authentication unit 205 determines that the power supply apparatus 130 is not trusted by the USB-IF. The predetermined time period is required to be a time period compliant with the USB PD standard and may be a time period of 4.5 s, for example. In a case where the predetermined authentication information is properly received within the predetermined time period, the PD communication unit 204 sends the received authentication information to the authentication unit 205.

The authentication unit 205 performs a predetermined authentication process compliant with the USB AUTH standard on the predetermined authentication information. In a case where the predetermined authentication process is a failure, the authentication unit 205 determines that the power supply apparatus 130 is not trusted by the USB-IF. Also, in a case where the predetermined authentication process is successful, the authentication unit 205 determines that the power supply apparatus 130 is trusted by the USB-IF. Here, the predetermined authentication process is a decoding process of the encrypted certificate that is capable of determining whether or not the authentication information is authentic. Also, in a case where the predetermined authentication process is successful, the authentication unit 205 obtains the XID (the identification information of the USB product) included in the electronic information of the decoded certificate.

The first authentication process on the cable 120 is similar to the first authentication process on the power supply apparatus 130. Note that the power receiving apparatus 200 may perform the first authentication process on one of the power supply apparatus 130 and the cable 120.

In step S406, the authentication unit 205 determines whether or not the power supply apparatus 130 and the cable 120 are both trusted by the USB-IF based on the result of the first authentication process of step S405. In a case where the power supply apparatus 130 and the cable 120 are trusted by the USB-IF (the first authentication process is successful), the process proceeds from step S406 to step S407. In a case where the power supply apparatus 130 or the cable 120 is not trusted by the USB-IF (the first authentication process is a failure), the process proceeds from step S406 to step S411.

Note that in a case where the first authentication process is performed on one of the power supply apparatus 130 and the cable 120 in step S405, the conditional branching of step S406 is carried out based on the authentication result of the USB product (for example, the power supply apparatus 130) on which the first authentication process was performed on.

In step S407, the control unit 250 performs the second authentication process to confirm whether or not the power supply apparatus 130 and the cable 120 are compliant with the USB standard (whether or not they have passed the USB standard compliance test). The second authentication process is performed by comparing the XIDs of the power supply apparatus 130 and the cable 120 obtained in step S406 with the USB compliance list stored in advance in the non-volatile memory 211.

Next, an example of a USB compliance list (compliance management information) will be described with reference to FIG. 5A. In FIG. 5A, 500 denotes a USB compliance list. 501 denotes one or more XIDs (XID list) included in the USB compliance list 500. 502 denotes USB compliance information associated with the XIDs. The USB compliance information 502, for example, may be a value "OK" indicating that the corresponding USB product is compliant with the USB standard, a value "NG" indicating non-compliance, or a value "test in progress" indicating that the test is in progress. The USB compliance information 502 associated with XID "0x9ABC_DEF0" is "NG".

503 denotes version information of the USB compliance information associated with the XIDs. The version information 503, for example, stores a numerical value or a character string that represents the version, such as "0.1", "1.0", or "2.0", for example. In the example of FIG. 5A, the greater the numerical value for the version information 503, the newer the information of the corresponding USB compliance information 502 and an extension region 504.

504 denotes the extension region associated with the XIDs. Information relating to the XIDs other than the USB compliance information is stored in the extension region 504. Any kind of information that is information associated with the XIDs other than the USB compliance information may be stored in the extension region 504. The information of the extension region 504 may be updated by new information associated with the XIDs when the USB compliance list is updated as described below. Also, for example, in a case where a user uses the operation unit 207 to select a menu or perform an operation to set for power to not be received from a USB product corresponding to a specific XID, the information of the extension region 504 may be updated. In the example of FIG. 5A, power has been set to not be received from the USB product with the XID "0x789A_1234" by a user using the operation unit 207 to select a menu or perform an operation, and a value "NG" (restrict power reception information) is stored in the extension region 504 associated with the XID "0x789A_1234". Naturally, FIG. 5A is an example, and the configuration of the USB compliance list is not limited to the configuration illustrated in FIG. 5A.

As described above, in step S407 of FIG. 4A, the control unit 250 compares the XID obtained in step S406 with the USB compliance list 500.

As an example, let's consider a case where the XID of the power supply apparatus 130 is "0x1234_5678" and the XID of the cable 120 is "0x9ABC_DEF0". In this case, in the USB compliance list 500 of FIG. 5A, the USB compliance information 502 associated with the XID of the power supply apparatus 130 is "OK", and the control unit 250 determines that the power supply apparatus 130 is compliant with the USB standard. Also, the USB compliance information 502 associated with the XID of the cable 120 is "NG", and the control unit 250 determines that the cable 120 is not compliant with the USB standard.

As another example, let's consider a case where the XID of the power supply apparatus 130 is "0x1234_5678" and the XID of the cable 120 is "0x789A_1234". In this case, in the USB compliance list 500 of FIG. 5A, the USB compliance information 502 associated with the XID of the power supply apparatus 130 is "OK", and the control unit 250 determines that the power supply apparatus 130 is compliant with the USB standard. Also, the USB compliance information 502 associated with the XID of the cable 120 is "OK", and the control unit 250 determines that the cable 120 is compliant with the USB standard. However, the extension region 504 associated with the XID of the cable 120 is "NG". Because of this, the control unit 250 may determine that the cable 120 is not compliant with the USB standard, disregarding the USB compliance information 502 associated with the XID of the cable 120, and determine that the second authentication process is a failure. In this manner, the control unit 250 may perform the second authentication process based on the information of the extension region 504 in addition to the USB compliance information 502.

Note that the USB compliance list 500 may not include the USB compliance information 502. In this case, for the control unit 250, the XID list 501 indicates the XID of a USB product that has passed the compliance test. Accordingly, in a case where the XID of the power supply apparatus 130 is included in the USB compliance list 500, the control unit 250 determines that the power supply apparatus 130 has passed the compliance test, for example.

Figure 5B:
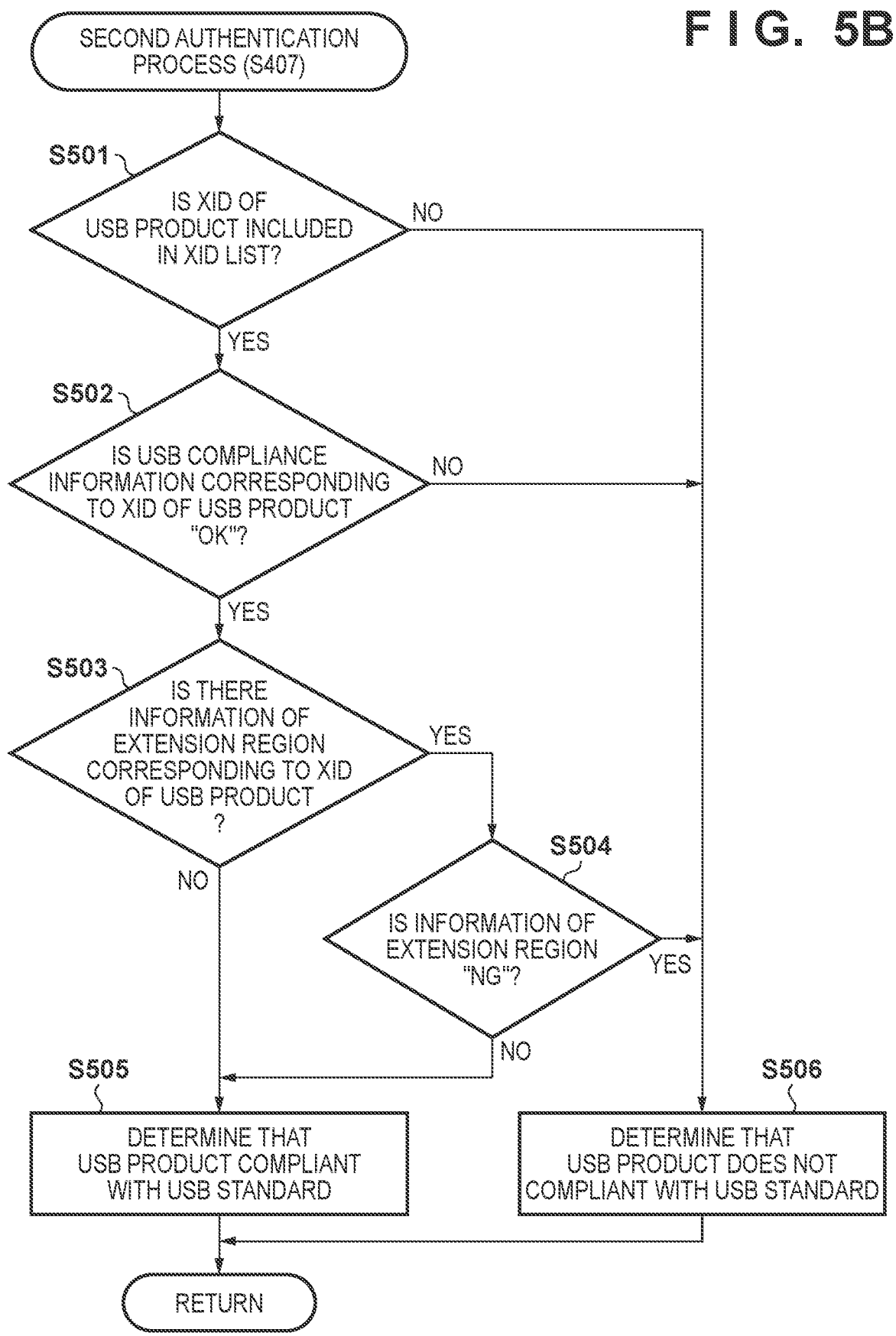
FIG. 5B is a flowchart for describing a second authentication process in step S407 of FIG. 4A.

The second authentication process of step S407 will be described below with reference to FIG. 5B. Note that the power receiving apparatus 200 may perform the second authentication process on one of the power supply apparatus 130 and the cable 120.

In step S408, the control unit 250 determines whether or not the power supply apparatus 130 and the cable 120 are compliant with the USB standard based on the result of the second authentication process of step S407. In a case where the power supply apparatus 130 and the cable 120 are compliant with the USB standard (the second authentication process is successful), the process proceeds from step S408 to step S409. In a case where the power supply apparatus 130 or the cable 120 is not compliant with the USB standard (the second authentication process is a failure), the process proceeds from step S408 to step S411.

Note that in a case where the second authentication process is performed on one of the power supply apparatus 130 and the cable 120 in step S407, the conditional branching of step S408 is carried out based on the authentication result of the USB product (for example, the power supply apparatus 130) on which the second authentication process was performed on.

In step S409, the PD communication unit 204 transmits and receives information using the USB PD standard communication protocol and sends a request for a supply of power P21 to the power supply apparatus 130 based on the information of power able to be supplied from the power supply apparatus 130. Here, the power P21 may be power exceeding the power P11. Also, the power P21 may be the power required for the operations of the power receiving apparatus 200. Also, the power P21 is determined by being selected from the information of power able to be supplied by the power supply apparatus 130 received in step S402. In the first embodiment, for example, the power P21 is 30 W (15 V, 2 A).

In step S410, the power receiving unit 201 performs control such that a power P22 (second power) received from the power supply apparatus 130 does not exceed the power P21 based on control from the control unit 250. In the first embodiment, the power receiving unit 201 controls the current value of power received from the power supply apparatus 130 to be 2 A or less so that the power P22 (the second power) does not exceed the power P21. Here, the power receiving unit 201 uses the supplied power P22 to supply to the components of the power receiving apparatus 200 the required power. Note that the power receiving apparatus 200 may remove the restriction on the operations set in step S404 and switch to operational settings of the components of the power receiving apparatus 200 such that they consume more power (however, the power P21 is not exceeded).

In a case where the power supply apparatus 130 is determined to not support the USB PD standard in step S402, in a case where the first authentication process is determined to be a failure in step S406, and in a case where the second authentication process is determined to be a failure in step S408, the process of step S411 is performed. In step S411, the control unit 250 performs control such that the power receiving unit 201 stops receiving power from the power supply apparatus 130, and the power receiving control of the flowchart ends. Also, the PD communication unit 204 may stop a communication process.

Note that in step S411, the control unit 250 may perform control such that power received by the power receiving unit 201 from the power supply apparatus 130 is restricted, instead of completely stopping the reception of power. The power received from the power supply apparatus 130 may be power less than 2.5 W (5 V, 500 mA), for example.

Note that the control unit 250 may perform a different process depending on the whether the transition to step S411 is from step S402, step S406, or step S408. For example, in a case where the transition to step S411 is from step S402, the power supply apparatus 130 does not support the USB PD standard. Thus, the control unit 250 performs control to stop power reception. In a case where the transition to step S411 is from step S406, the power supply apparatus 130 supports the USB PD standard, but it cannot be confirmed that the power supply apparatus 130 was manufactured by a trusted manufacturer. Thus, the control unit 250 performs control to receive power at a relatively low power of 0.5 W (5 V, 100 mA), for example. In a case where the transition to step S411 is from step S408, the power supply apparatus 130 supports the USB PD standard and it can be confirmed that the power supply apparatus 130 was manufactured by a trusted manufacturer, but it cannot be confirmed that the power supply apparatus 130 is compliant with the USB standard. Thus, the control unit 250 performs control to receive power at a relatively high power of 2.5 W (5 V, 500 mA), for example, without the power exceeding the power P11.

Next, the second authentication process of step S407 of FIG. 4A will be described with reference to FIG. 5B. In the example described below, the second authentication process is performed on the power supply apparatus 130. However, the second authentication process on the cable 120 is performed in a similar manner.

In step S501, the control unit 250 determines whether or not an XID in the XID list 501 matches the XID of the power supply apparatus 130 obtained via the first authentication process (step S406 of FIG. 4A) by comparing the obtained XID to the XID list 501 of the USB compliance list 500. In a case where an XID matching the XID of the power supply apparatus 130 is present in the XID list 501, the process proceeds from step S501 to step S502. In a case where an XID matching the XID of the power supply apparatus 130 is not present in the XID list 501, the process proceeds from step S501 to step S506. For example, in a case where the XID of the power supply apparatus 130 is "0x1234_5678", because a matching XID "0x1234_5678" is present in the XID list 501, the process proceeds from step S501 to step S502.

In step S502, the control unit 250 determines whether or not the USB compliance information 502 associated with the XID of the power supply apparatus 130 in the USB compliance list 500 is "OK" (information indicating that the USB product is compliant with the USB standard). In a case where the USB compliance information 502 associated with the XID of the power supply apparatus 130 is "OK", the process proceeds from step S502 to step S503. In a case where the USB compliance information 502 associated with the XID of the power supply apparatus 130 is not "OK", the process proceeds from step S502 to step S506. For example, in a case where the XID of the power supply apparatus 130 is "0x1234_5678", because the corresponding USB compliance information 502 is "OK" (information indicating that the USB product is compliant with the USB standard), the process proceeds from step S502 to step S503.

In step S503, the control unit 250 determines whether or not information of the extension region 504 associated with the XID of the power supply apparatus 130 is present in the USB compliance list 500. In a case where information of the extension region 504 associated with the XID of the power supply apparatus 130 is present, the process proceeds from step S503 to step S504. In a case where information of the extension region 504 associated with the XID of the power supply apparatus 130 is not present, the process proceeds from step S503 to step S505. For example, in a case where the XID of the power supply apparatus 130 is "0x1234_5678", because information of the corresponding extension region 504 is not present, the process proceeds from step S503 to step S505. As another example, in a case where the XID of the power supply apparatus 130 is "0x789A_1234", because information of the corresponding extension region 504 is present, the process proceeds from step S503 to step S504.

In step S504, the control unit 250 determines whether or not the information of the extension region 504 associated with the XID of the power supply apparatus 130 is "NG". In a case where the information of the extension region 504 associated with the XID of the power supply apparatus 130 is "NG", the process proceeds from step S504 to step S506. In a case where the information of the extension region 504 associated with the XID of the power supply apparatus 130 is not "NG", the process proceeds from step S504 to step S505. For example, in a case where the XID of the power supply apparatus 130 is "0x789A_1234", because the information of the corresponding extension region 504 is "NG", the process proceeds from step S504 to step S506.

In step S505, the control unit 250 determines that the power supply apparatus 130 is compliant with the USB standard. Accordingly, in a case where the USB compliance information 502 corresponding to the XID of the power supply apparatus 130 is "OK" and "NG" is not present in the extension region 504 corresponding to the XID of the power supply apparatus 130, the second authentication process on the power supply apparatus 130 is successful.

On the other hand, in step S506, the control unit 250 determines that the power supply apparatus 130 is not compliant with the USB standard. Accordingly, in a case where an XID of the power supply apparatus 130 is not present in the XID list 501 or the corresponding USB compliance information 502 is not "OK" or "NG" is present in the corresponding extension region 504, the second authentication process on the power supply apparatus 130 is a failure.

Note that the control unit 250 may perform the second authentication process without using the information of the extension region 504. In this case, step S503 and step S504 are not performed, and in a case where the USB compliance information 502 corresponding to the XID of the power supply apparatus 130 is "OK", the process proceeds from step S502 to step S505.

According to the power reception control described above, in a case where the power supply apparatus 130 is trusted by the USB-IF and the power supply apparatus 130 is confirmed to be compliant with the USB standard, control to receive the power P22, which is greater than the power P12, is performed. Thus, according to the power reception control described above, the safety of power reception can be further improved.

Figure 4B:
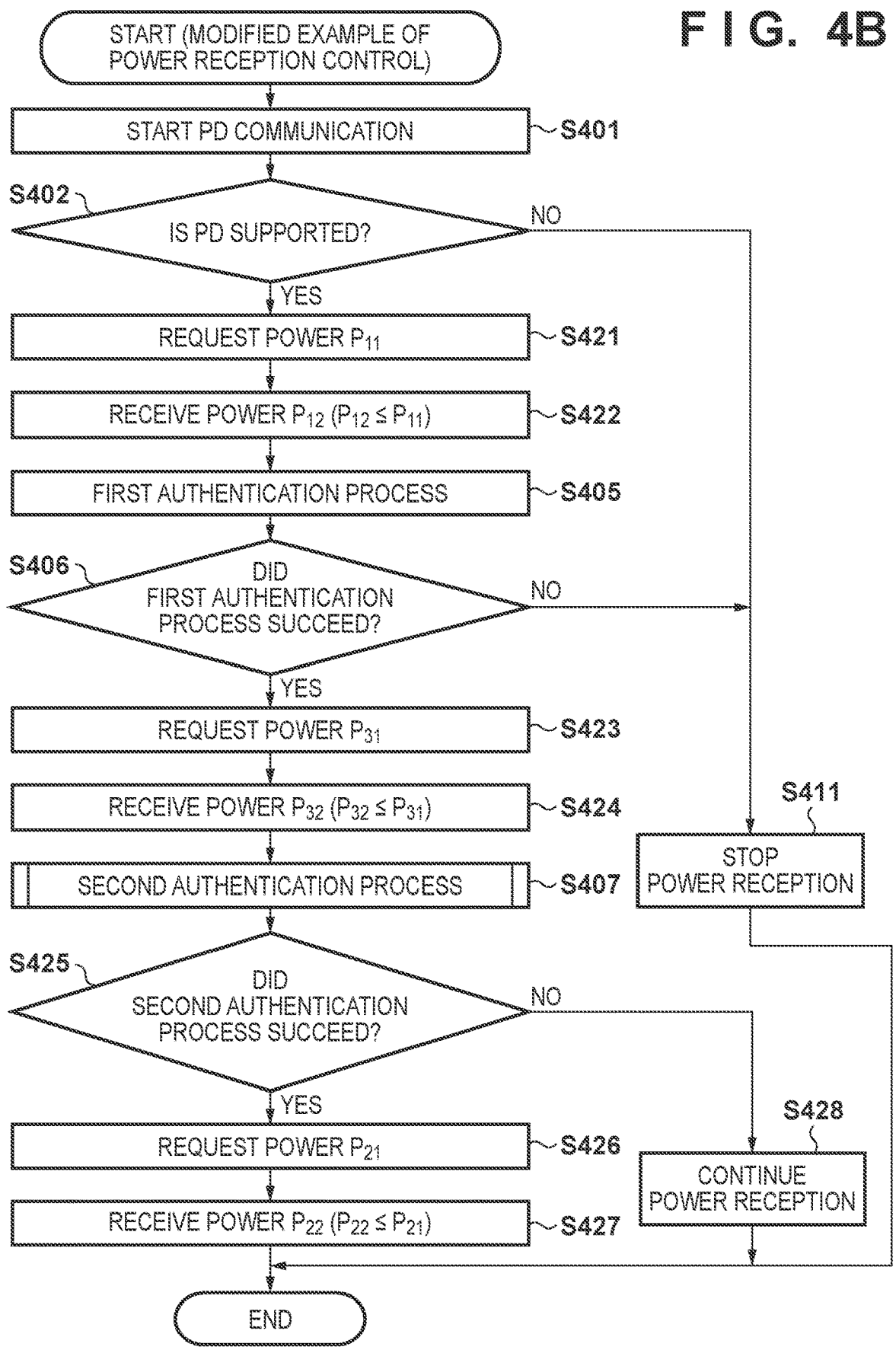
FIG. 4B is a flowchart for describing a power reception control according to a modified example of the first embodiment.

FIG. 4B is a flowchart for describing a power reception control according to a modified example of the first embodiment. In FIG. 4B, steps that are the same or similar to those of FIG. 4A are given the same reference sign. When the control unit 250 detects that the power supply apparatus 130 has connected to the connection unit 210 via the cable 120, the flowchart starts.

In step S421, the PD communication unit 204 transmits and receives information using the USB PD standard communication protocol and sends a request for a supply of power P11 to the power supply apparatus 130. Here, the power P11 is required to be the minimum amount of power required for the power receiving apparatus 200 to perform the first authentication process of step S405. Also, the power P11 is determined by being selected from the information of power able to be supplied by the power supply apparatus 130 received in step S402. In the first embodiment, for example, the power P11 is 2.5 W (5 V, 500 mA).

In step S422, the power receiving unit 201 performs control such that a power P12 (first power) received from the power supply apparatus 130 does not exceed the power P11 based on control from the control unit 250. In the first embodiment, the power receiving unit 201 controls the current value of power received from the power supply apparatus 130 to be 500 mA or less so that the power P12 (the first power) does not exceed the power P11. Here, the power receiving unit 201 uses the supplied power P12 to supply the necessary power to the components of the power receiving apparatus 200, for the power receiving apparatus 200 to perform the first authentication process of step S405. Also, to ensure that there is sufficient power for the first authentication process, components of the power receiving apparatus 200 that are not involved in the first authentication process may be restricted in operation to reduce power consumption. For example, in a case where the power required to perform the first authentication process is 0.5 W and the components of the power receiving apparatus 200 that are not involved in the first authentication process do not consume power, the power receiving unit 201 may perform control to make the current value received from the power supply apparatus 130 is 100 mA.

In step S423, the PD communication unit 204 transmits and receives information using the USB PD standard communication protocol and sends a request for a supply of power P31 to the power supply apparatus 130 based on the information of power able to be supplied from the power supply apparatus 130. Here, the power P31 is required to be the minimum amount of power required for the power receiving apparatus 200 to perform the second authentication process of step S407. Also, the power P31 may exceed the power P11, but it is less than the power P21 described below. Also, the power P31 is determined by being selected from the information of power able to be supplied by the power supply apparatus 130 received in step S402. In the first embodiment, for example, the power P31 is 15 W (5 V, 3 A).

In step S424, the power receiving unit 201 performs control such that a power P32 (third power) received from the power supply apparatus 130 does not exceed the power P31 based on control from the control unit 250. In the first embodiment, the power receiving unit 201 controls the current value of power received from the power supply apparatus 130 to be 3 A or less so that the power P32 (the third power) does not exceed the power P31. The power P32 (the third power) is greater than the power P12 (the first power) and less than the power P22 (the second power). Here, the power receiving unit 201 uses the supplied power P32 to supply the necessary power to the components of the power receiving apparatus 200, for the power receiving apparatus 200 to perform the second authentication process of step S407. Also, to ensure that there is sufficient power for the second authentication process, components of the power receiving apparatus 200 that are not involved in the second authentication process may be restricted in operation to reduce power consumption. For example, in a case where the power required to perform the second authentication process is 5 W and the components of the power receiving apparatus 200 that are not involved in the second authentication process do not consume power, the power receiving unit 201 may perform control to make the current value received from the power supply apparatus 130 is 1 A.

The process of step S425 is similar to the process of step S408, except for the determination result affecting which step is transitioned to. Specifically, in a case where the second authentication process of step S407 is successful, the process proceeds from step S425 to step S426. In a case where the second authentication process is a failure, the process proceeds from step S425 to step S428.

In step S426, the PD communication unit 204 transmits and receives information using the USB PD standard communication protocol and sends a request for a supply of power P21 to the power supply apparatus 130 based on the information of power able to be supplied from the power supply apparatus 130. Here, the power P21 may be power exceeding the power P31. Also, the power P21 may be the power required for the operations of the power receiving apparatus 200. Also, the power P21 is determined by being selected from the information of power able to be supplied by the power supply apparatus 130 received in step S402. In the first embodiment, for example, the power P21 is 30 W (15 V, 2 A).

In step S427, the power receiving unit 201 performs control such that a power P22 (second power) received from the power supply apparatus 130 does not exceed the power P21 based on control from the control unit 250. In the first embodiment, the power receiving unit 201 controls the current value of power received from the power supply apparatus 130 to be 2 A or less so that the power P22 (the second power) does not exceed the power P21. Here, the power receiving unit 201 uses the supplied power P22 to supply to the components of the power receiving apparatus 200 the required power. Note that the power receiving apparatus 200 may remove the restriction on the operations set in step S422 and step S424 and switch to operational settings of the components of the power receiving apparatus 200 such that they consume more power (however, the power P21 is not exceeded).

In step S425, in a case where the second authentication process is determined to be a failure, the process of step S428 is performed. In step S428, the control unit 250 performs control to have the power receiving unit 201 continue receiving the power P32 (see step S424).

Note that in the example of FIG. 4B, the power receiving unit 201 requests the power P31 and receives the power P32 (step S423 and step S424) before the second authentication process (step S407) is performed. However, the power receiving unit 201 may request the power P31 and receive the power P32 (step S423 and step S424) after the second authentication process (step S407) has failed.

According to the power reception control according to the modified example described above, power reception control can be performing according to the safety (trustability) level of the power supply apparatus 130. At the time of step S422 (before the first authentication process has been performed), it is unknown whether or not the power supply apparatus 130 has been manufactured by a trusted manufacturer. Also, at the time of step S424 (after the first authentication process has been successful and before the second authentication process has been performed), it is unknown whether or not the power supply apparatus 130 is compliant with the USB standard. However, because it has been confirmed that the power supply apparatus 130 has been manufactured by a trusted manufacturer, the power supply apparatus 130 can be trusted to a certain degree. Furthermore, at the time of step S427 (after the first authentication process and the second authentication process have been successful), it has been confirmed that the power supply apparatus 130 has been manufactured by a trusted manufacturer and that the power supply apparatus 130 is compliant with the USB standard, and thus the power supply apparatus 130 at the time of step S427 is more reliable than the power supply apparatus 130 at the time of step S424. Thus, the power supply apparatus 130 can be trusted more so than at the time of step S424. Thus, power received by the power receiving apparatus 200 is incrementally increased in order from the time of step S422, the time of step S424, and the time of step S427. In this manner, even in a case where the power supply apparatus 130 is not compliant with the USB standard, the power receiving apparatus 200 can receive a certain amount of power while ensuring safety. As a result, for example, even in a case where the power consumption of the second authentication process is greater than the power P11 (maximum value of the power P12), the power receiving apparatus 200 can perform the second authentication process by receiving the power P32.

As described above, according to the first embodiment, the power receiving apparatus 200 obtains a certificate including an XID from the power supply apparatus 130 using the USB AUTH standard and determines whether or not the certificate is authentic (the first authentication process). Also, the power receiving apparatus 200 determines whether or not the power supply apparatus 130 has passed the compliance test of the USB standard based on the XID (the second authentication process). In a case where the certificate is determined to be authentic and the power supply apparatus 130 is determined to have passed the compliance test, the power receiving apparatus 200 performs control to receive, from the power supply apparatus 130, the power P22 (the second power), which is greater than the power P12 (the first power). This allows the safety relating to the power receiving apparatus 200 receiving power from the power supply apparatus 130 to be further improved.

Note that in the example described above, the second authentication process uses the XID of the power supply apparatus 130 and the USB compliance list 500. However, the first embodiment is not limited to a configuration that uses the USB compliance list 500. Any configuration able to determine the pass/failure of the compliance test based on the XID that identifies the power supply apparatus 130 is included in the scope of the first embodiment.

Second Embodiment

In a second embodiment described below, a USB compliance list (a first compliance management information) stored in the non-volatile memory 211 is updated by the power receiving apparatus 200 obtaining a USB compliance list (a second compliance management information) from the power supply apparatus 130. In the second embodiment, the basic system configuration is similar to that of the first embodiment (see FIG. 1). The differences from the first embodiment will primarily be described below.

Note that the manufacturer of the power supply apparatus 130 can store the USB compliance list in the non-volatile memory of the power supply apparatus 130 before the power supply apparatus 130 is shipped, for example.

Figure 6:
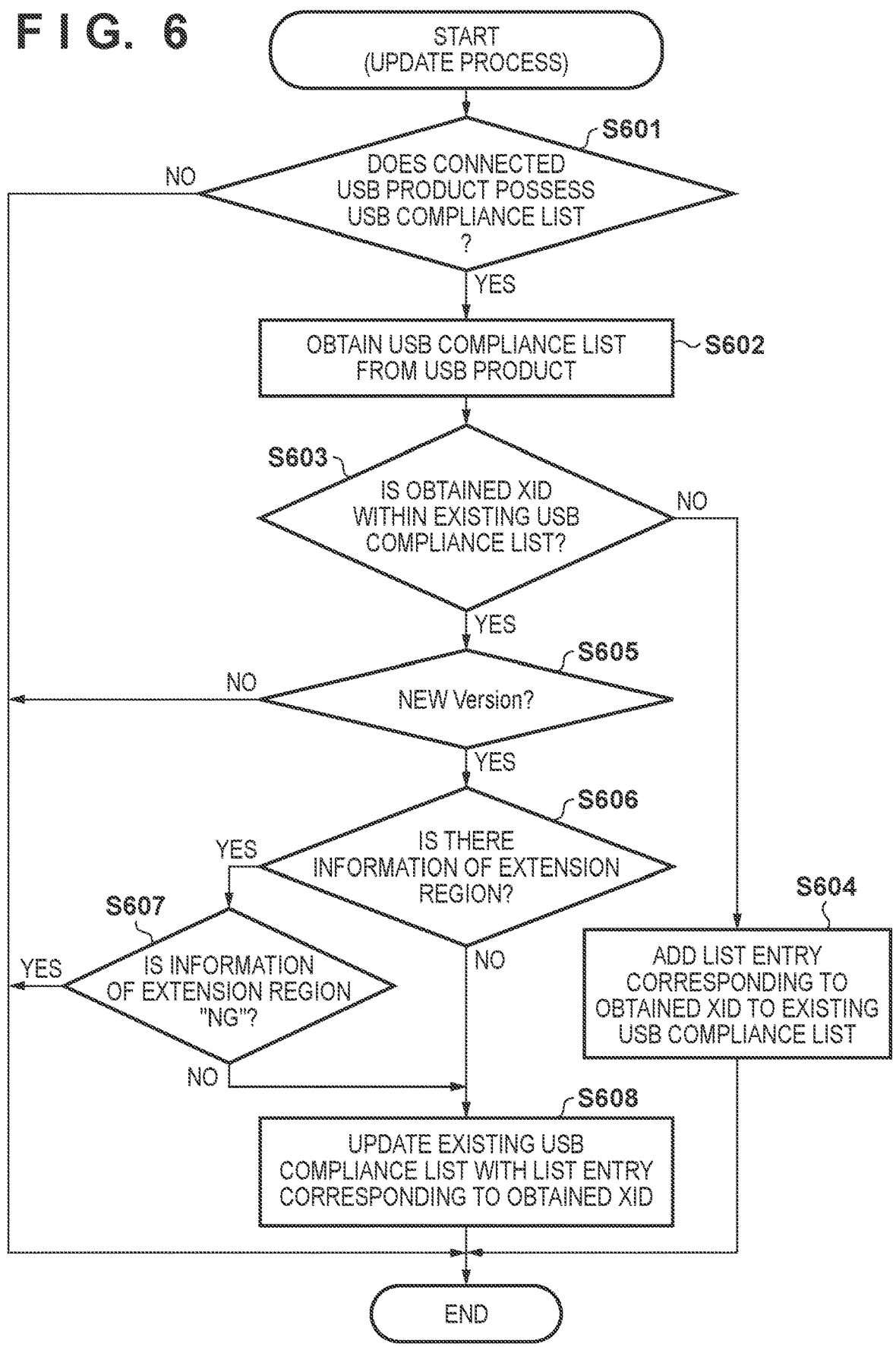
FIG. 6 is a flowchart for describing a process of updating a USB compliance list according to a second embodiment.

FIG. 6 is a flowchart for describing a process of updating the USB compliance list according to the second embodiment. When the information update determination unit 213 of the power receiving apparatus 200 determines to update the USB compliance list, the flowchart starts.

Note that the conditions for the information update determination unit 213 to determine to update the USB compliance list are not particularly limited. For example, as described in the first embodiment, the information update determination unit 213 determines to update the USB compliance list in accordance with the control unit 250 determining that the power supply apparatus 130 and the cable 120 are connected to the connection unit 210.

Also, the update process of FIG. 6 is performed on each USB product directly or indirectly connected to the connection unit 210. In the example described below, the update process is performed on the power supply apparatus 130. However, the update process on the cable 120 is performed in a similar manner.

In step S601, the information update determination unit 213 performs a query for determining whether or not the power supply apparatus 130 possesses a USB compliance list via data communication by the PD communication unit 204. The information update determination unit 213 determines whether or not the power supply apparatus 130 possesses a USB compliance list based on the reply from the power supply apparatus 130. In a case where the power supply apparatus 130 possesses a USB compliance list, the process proceeds from step S601 to step S602. In a case where the power supply apparatus 130 does not possess a USB compliance list, the update process of the flowchart ends.

In step S602, the information obtaining unit 214 obtains the USB compliance list from the power supply apparatus 130 via data communication by the PD communication unit 204. The USB compliance list obtained from the power supply apparatus 130 (hereinafter, referred to as the "USB compliance list of the power supply apparatus 130") has a similar data structure (see FIG. 5A) as the USB compliance list (hereinafter, referred to as the "existing USB compliance list") stored in the non-volatile memory 211 of the power receiving apparatus 200. However, the USB compliance list of the power supply apparatus 130 may not include information of the extension region 504.

Hereinafter, an information set corresponding to a single row of the USB compliance list 500 illustrated in FIG. 5A is referred to as a "list entry". For example, the USB compliance list of the power supply apparatus 130 includes a list entry in which a USB compliance information of "OK" and a version of "1.0" are associated with an XID of "0x1234_5678".

Note that the USB compliance list of the power supply apparatus 130 may include XIDs. In this case, the process after step S603 is performed on the target XIDs (target identification information) of the XIDs. Also, the USB compliance list of the power supply apparatus 130 may include the XID of the power supply apparatus 130 or may not.

In step S603, the information updating unit 215 determines whether or not the XID (hereinafter, referred to as the "obtained XID") included in the USB compliance list of the power supply apparatus 130 is present in the existing USB compliance list. In a case where the obtained XID is present in the existing USB compliance list, the process proceeds from step S603 to step S605. In a case where the obtained XID is not present in the existing USB compliance list, the process proceeds from step S603 to step S604.

In step S604, the information updating unit 215 adds the list entry corresponding to the obtained XID to the existing USB compliance list.

In step S605, the information updating unit 215 determines whether or not the version associated with the obtained XID is newer than the version (hereinafter, referred to as the "current version") associated with the same XID present in the existing USB compliance list. In a case where the version associated with the obtained XID is newer than the current version, the process proceeds from step S605 to step S606. In a case where the version associated with obtained XID is not newer than the current version, there is no need to update the existing USB compliance list, and thus the update process of the flowchart ends.

Note that the USB compliance list of the power supply apparatus 130 and the existing USB compliance list may not include the version (version information). In this case, for example, in a case where the obtained XID is determined to be present in the existing USB compliance list in step S603, the update process of the flowchart ends.

In step S606, the information updating unit 215 determines whether or not information is present in the extension region of the existing USB compliance list corresponding to the obtained XID. In a case where information is present in the extension region, the process proceeds from step S606 to step S607. In a case where information is not present in the extension region, the process proceeds from step S606 to step S608.

In step S607, the information updating unit 215 determines whether or not the information of the extension region is "NG" (restrict power reception information indicating to not receive power from the USB product). In a case where the information of the extension region is "NG", the update process of the flowchart ends. In a case where the information of the extension region is not "NG", the process proceeds from step S607 to step S608.

In step S608, the information updating unit 215 updates the existing USB compliance list with the list entry corresponding to the obtained XID.

As described above, according to the second embodiment, the power receiving apparatus 200 obtains the USB compliance list (the second compliance management information) from the power supply apparatus 130. The power receiving apparatus 200 updates the USB compliance list (the first compliance management information) stored in the non-volatile memory 211 based on the USB compliance list (the second compliance management information) obtained from the power supply apparatus 130. This allows the utility of the USB compliance list held by the power receiving apparatus 200 to be improved.

Third Embodiment

In a third embodiment described below, a USB compliance list (the first compliance management information) stored in the non-volatile memory 211 is updated by the power receiving apparatus 200 obtaining a USB compliance list (the second compliance management information) from the wireless communication apparatus 300. In the third embodiment, the basic system configuration is similar to that of the first embodiment (see FIG. 1). The differences from the first embodiment will primarily be described below.

FIG. 7 is a sequence chart for describing a process of updating the USB compliance list according to the third embodiment. When the information update determination unit 213 of the power receiving apparatus 200 determines to update the USB compliance list, the sequence chart starts.

Note that the conditions for the information update determination unit 213 to determine to update the USB compliance list are not particularly limited. For example, as described in the first embodiment, the information update determination unit 213 determines to update the USB compliance list when a predetermined input is performed by a user using the operation unit 207.

In step S700, the control unit 250 of the power receiving apparatus 200 performs a process of establishing a wireless connection with the wireless communication apparatus 300 using the wireless communication unit 212. In a similar manner, the control unit 350 of the wireless communication apparatus 300 performs a process of establishing a wireless connection with the power receiving apparatus 200 using the wireless communication unit 304.

Note that in a case where the power supply apparatus 130 is connected to the connection unit 210, the control unit 250 of the power receiving apparatus 200 may start the process of step S700 to establish a wireless connection with the wireless communication apparatus 300. Also, in a case where an operation has been performed to view an image of the power receiving apparatus 200 on the wireless communication apparatus 300, the control unit 350 of the wireless communication apparatus 300 may start the process of step S700 to establish a wireless connection with the power receiving apparatus 200. In these cases, the information update determination unit 213 may determine to update the USB compliance list in response to a wireless connection being established.

In step S701, the control unit 250 of the power receiving apparatus 200 uses the wireless communication unit 212 to transmit to the wireless communication apparatus 300 the XID included in the USB compliance list (the USB compliance list of the power receiving apparatus 200) stored in the non-volatile memory 211. The control unit 350 of the wireless communication apparatus 300 receives the XID transmitted from the power receiving apparatus 200 using the wireless communication unit 304.

Note that in step S701, the control unit 250 may transmit the XID of the USB product (for example, the power supply apparatus 130) connected to the current connection unit 210 instead of or in addition to the XID included in the USB compliance list of the power receiving apparatus 200. Also, the control unit 250 may transmit the XID of a USB product that previously connected to the connection unit 210. To enable the XIDs of USB products that previously connected to the connection unit 210 to be transmitted, the power receiving apparatus 200 collects the XIDs of the USB products that connect to the connection unit 210. A XID collection process will be described below.

In step S702, the control unit 350 of the wireless communication apparatus 300 uses the wireless communication unit 305 to send a request to the cloud server 150 for the USB compliance information corresponding to the XID received in step S701.

In step S703, the control unit 350 of the wireless communication apparatus 300 uses the wireless communication unit 305 to receive the USB compliance information requested in step S702 from the cloud server 150. Note that here receiving the USB compliance information may be performed by receiving information with a data structure similar to that of the USB compliance list 500 illustrated in FIG. 5A, for example.

In step S704, the control unit 350 of the wireless communication apparatus 300 generates a USB compliance list based on the XID received in step S701 and the USB compliance information received in step S703 and stores this in the non-volatile memory 303. The USB compliance list stored in the non-volatile memory 303 (hereinafter, referred to as the "USB compliance list of the wireless communication apparatus 300" has a data structure similar to that of the USB compliance list 500 illustrated in FIG. 5A, for example. Note that in a case where a USB compliance list of the wireless communication apparatus 300 is already present, the control unit 350, for example, updates the USB compliance list of the wireless communication apparatus 300 via a process similar to the update process illustrated in FIG. 6. To perform the update process, in step S703, the control unit 350 may receive version information in addition to the USB compliance information. Alternatively, because it is highly likely that the newest USB compliance information is stored in the cloud server 150, the control unit 350 may perform update process without using version information. In this case, for example, in a case where the obtained XID is determined to be present in the existing USB compliance list in step S603 of FIG. 6, the update process of step S608 is performed.

In step S705, the control unit 350 of the wireless communication apparatus 300 uses the wireless communication unit 304 to transmit the USB compliance list of the wireless communication apparatus 300 to the power receiving apparatus 200. The control unit 250 of the power receiving apparatus 200 uses the wireless communication unit 212 to receive the USB compliance list of the wireless communication apparatus 300 from the wireless communication apparatus 300.

In step S706, the control unit 250 of the power receiving apparatus 200 updates the USB compliance list of the power receiving apparatus 200 based on the USB compliance list of the wireless communication apparatus 300 received in step S705. The control unit 250 is capable of updating the USB compliance list of the power receiving apparatus 200 via a process similar to the update process illustrated in FIG. 6, for example. Also, in a similar manner to the update process of step S704 described above, the control unit 250 may perform update process without using version information.

Figures 8A, 8B:
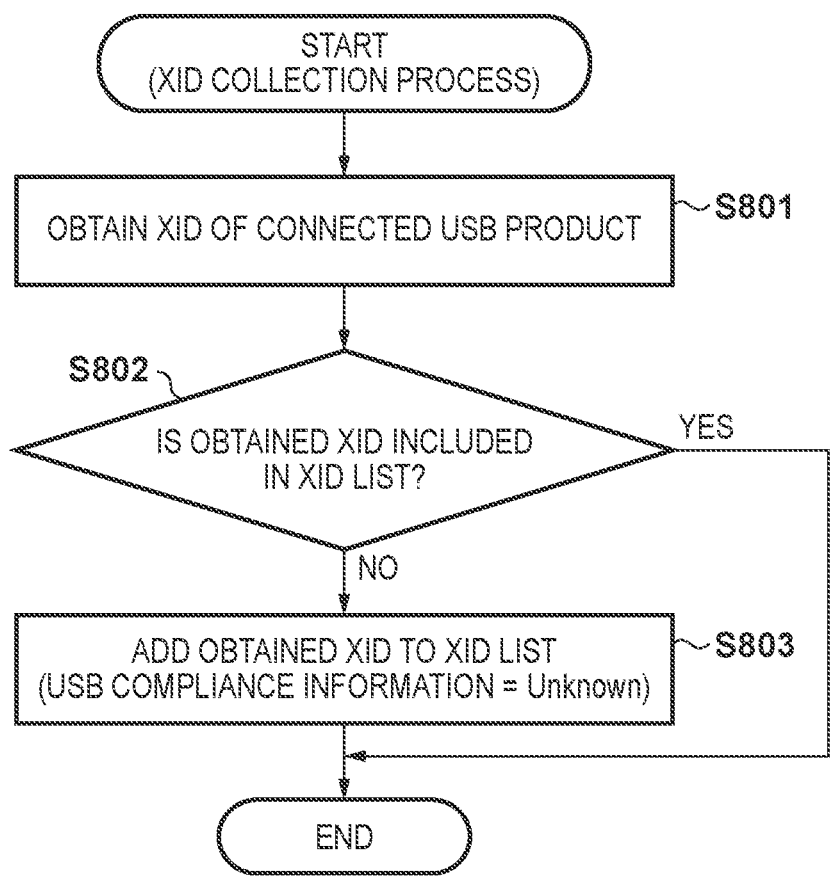
FIG. 8A is a flowchart for describing a XID collection process according to the third embodiment.
FIG. 8B is a diagram for describing an example of a USB compliance list including an added XID.

FIG. 8A is a flowchart for describing a XID collection process according to the third embodiment. When the control unit 250 detects that a USB product has connected to the connection unit 210, the flowchart starts. In the example described below, the power supply apparatus 130 is connected to the connection unit 210.

In step S801, the control unit 250 obtains the XID of the power supply apparatus 130 from the power supply apparatus 130. In this example, the XID "0x5678_ABCD" is obtained. The method for obtaining the XID is not particularly limited, and, for example, the control unit 250 may obtain the XID obtained via the first authentication process in step S405 of FIG. 4A by the authentication unit 205.

In step S802, the control unit 250 determines whether or not the XID obtained in step S801 is included in the XID list 501 of the USB compliance list 500 in the non-volatile memory 211. In a case where the obtained XID is included in the XID list 501, the flowchart ends. In a case where the obtained XID is not included in the XID list 501, the process proceeds from step S802 to step S803.

In step S803, the control unit 250 adds the XID obtained in step S801 to the XID list 501. Also, the control unit 250 associates the USB compliance information "Unknown" and the version "0" with the XID.

FIG. 8B is a diagram for describing an example of a USB compliance list including an added XID. Compared to FIG. 5A, the row 851 including the XID "0x5678_ABCD" has been added in FIG. 8B.

The control unit 250 is capable of collecting XIDs with unknown USB compliance information by adding to the USB compliance list new XIDs obtained from USB products connected to the connection unit 210. Also, the control unit 250 is capable of obtaining the corresponding USB compliance information by transmitting the collected XID to the wireless communication apparatus 300 in step S701 as described above.

Note that the XID collection destination is not limited to the USB compliance list. Also, it is not required that a USB compliance information of "unknown" or the like is associated with the collected XID. For example, the control unit 250 may generate a new XID list in the non-volatile memory 211 and collect new XIDs in the new XID list.

According to the third embodiment, in a case where the user has power receiving apparatuses or the like, the USB compliance list can be shared between the power receiving apparatuses via the wireless communication apparatus 300.

FIG. 9 is a diagram for describing an example of sharing a USB compliance list. In this example, the user has, in addition to the power receiving apparatus 200, a power receiving apparatus 900 with a similar configuration to the power receiving apparatus 200. A connection unit 910 and a wireless communication medium 960 have similar configurations to the connection unit 210 and the wireless communication medium 360, respectively. Also, in this example, the user has, in addition to the cable 120 and the power supply apparatus 130, a cable 920 and a power supply apparatus 930 with similar configurations to the cable 120 and the power supply apparatus 130, respectively.

In the state illustrated in FIG. 9, when the power receiving apparatus 200 to which the power supply apparatus 130 has connected to before performs the update process illustrated in FIG. 7, in step S704, the XID and the USB compliance information of the power supply apparatus 130 are stored in the USB compliance list of the wireless communication apparatus 300. Thereafter, when the power receiving apparatus 900 performs the update process illustrated in FIG. 7, via the process of step S705 and step S706, the XID and the USB compliance information of the power supply apparatus 130 are stored in the USB compliance list of the power receiving apparatus 900. In a similar manner, when the power receiving apparatus 900 to which the power supply apparatus 930 has connected to before performs the update process illustrated in FIG. 7, in step S704, the XID and the USB compliance information of the power supply apparatus 930 are stored in the USB compliance list of the wireless communication apparatus 300. Thereafter, when the power receiving apparatus 200 performs the update process illustrated in FIG. 7, via the processes of step S705 and step S706, the XID and the USB compliance information of the power supply apparatus 930 are stored in the USB compliance list of the power receiving apparatus 200.

The power receiving apparatuses 200 and 900 can share the USB compliance list by performing the update process using the wireless communication apparatus 300. Accordingly, even in a case where the wireless communication apparatus 300 is unusable when the power supply apparatus 130 is connected to the power receiving apparatus 900 for the first time, by the USB compliance list being shared in advance, the power receiving apparatus 900 can determine the standard compliance of the power supply apparatus 130.

As described above, according to the third embodiment, the power receiving apparatus 200 obtains the USB compliance list (the second compliance management information) from the wireless communication apparatus 300 (communication apparatus). The power receiving apparatus 200 updates the USB compliance list (the first compliance management information) stored in the non-volatile memory 211 based on the USB compliance list (the second compliance management information) obtained from the wireless communication apparatus 300. This allows the utility of the USB compliance list held by the power receiving apparatus 200 to be improved.

Also, according to the third embodiment, the power receiving apparatus 200 obtains the XID of the power supply apparatus 130 from the power supply apparatus 130 and collects this in the non-volatile memory 211 and transmits the collected XID of the power supply apparatus 130 to the wireless communication apparatus 300. Furthermore, the power receiving apparatus 200 receives the USB compliance information associated with the XID of the power supply apparatus 130 from the wireless communication apparatus 300 and stores this in the non-volatile memory 211. In this manner, the XID and the USB compliance information of the power supply apparatus 130 which has actually connected (and is highly likely to connect again) to the power receiving apparatus 200 before can be selectively stored in the USB compliance list. This enables the storage region of the non-volatile memory 211 to be effectively used.

Fourth Embodiment

In a fourth embodiment described below, information (a message) is displayed when the first authentication process or the second authentication process is a failure. In the fourth embodiment, the basic system configuration is similar to that of the first embodiment (see FIG. 1). The differences from the first embodiment will primarily be described below.

Figure 10:
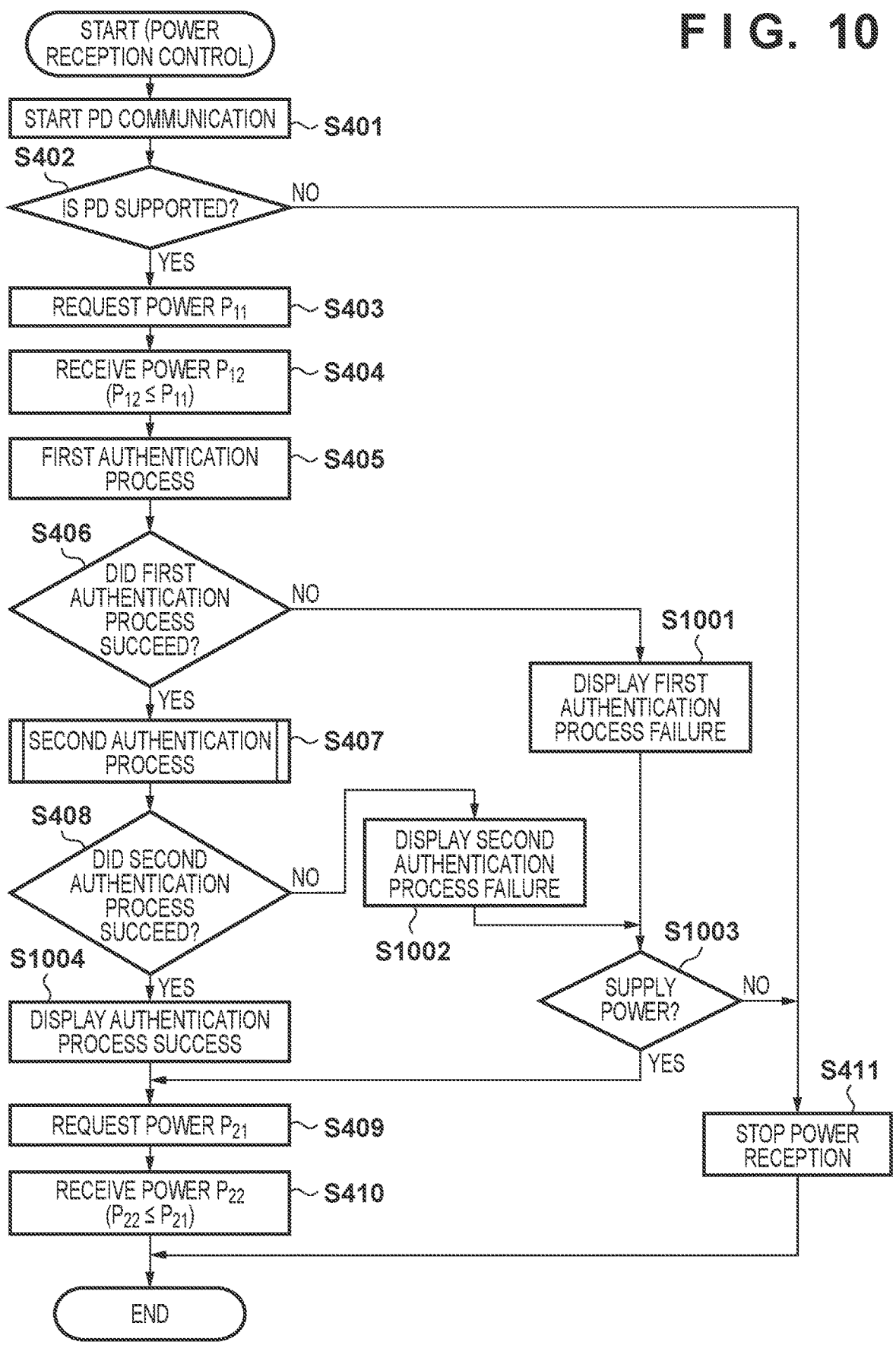
FIG. 10 is a flowchart for describing a power reception control according to a fourth embodiment.

FIG. 10 is a flowchart for describing a power reception control in the fourth embodiment. In the flowchart, steps that are the same or similar to those of FIG. 4A are given the same reference sign. When the control unit 250 detects that the power supply apparatus 130 has connected to the connection unit 210 via the cable 120, the flowchart starts. In the example described below, the first authentication process and the second authentication process are performed on the power supply apparatus 130. However, the same applies in a case where the first authentication process and the second authentication process are performed on another USB product.

Note that the process of step S406 of FIG. 10 is similar to that of step S406 of FIG. 4A, but is different from that of step S406 of FIG. 4A in terms of which step is transitioned to in a case where the first authentication process is a failure. Specifically, in a case where the first authentication process is a failure, the process proceeds from step S406 to step S1001. Also, the process of step S408 of FIG. 10 is similar to that of step S408 of FIG. 4A, but is different from that of step S408 of FIG. 4A in terms of which step is transitioned to in a case where the second authentication process is successful and in a case where the second authentication process is a failure. Specifically, in a case where the second authentication process is successful, the process proceeds from step S408 to step S1004. In a case where the second authentication process is a failure, the process proceeds from step S408 to step S1002.

In step S1001, the control unit 250 performs first display control to display first information. For example, the control unit 250 displays on the display unit 208 information indicating that the power supply apparatus 130 is not trusted by the USB-IF (that the first authentication process is a failure). Also, the control unit 250 displays on the display unit 208 information prompting the user to select whether or not to perform power supply (receive the power P22) using the power supply apparatus 130.

Figure 11A:
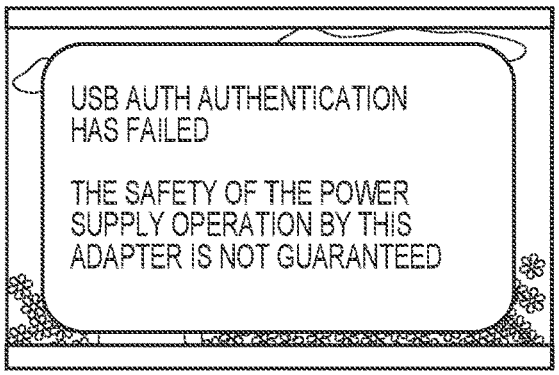
FIGS. 11A to 11G are diagrams illustrating display examples of information (messages) relating to power reception control according to the fourth embodiment.
Figure 11B:
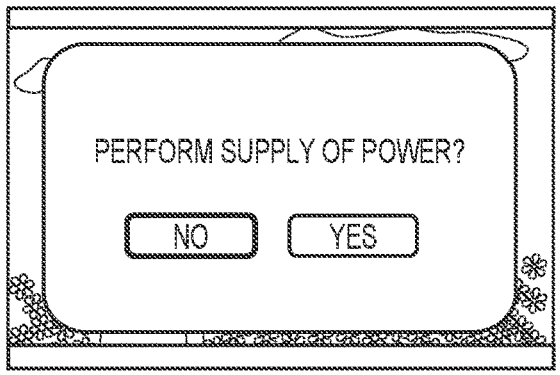

FIGS. 11A and 11B are diagrams illustrating display examples of the information in step S1001. First, as illustrated in FIG. 11A, the control unit 250 displays on the display unit 208 information indicating that the power supply apparatus 130 is not trusted by the USB-IF (that the first authentication process is a failure). Then (for example, after a predetermined amount of time has elapsed), as illustrated in FIG. 11B, the control unit 250 displays on the display unit 208 information prompting the user to select whether or not to perform power supply (receive the power P22) using the power supply apparatus 130. Note that the method of displaying the information in step S1001 is not particularly limited, and the control unit 250 may display the information corresponding to FIG. 11A and the information corresponding to FIG. 11B together on one screen, as illustrated in FIG. 11C.

Via the information displayed in step S1001, the user can come to know that the first authentication process is a failure. Then, in responding to this information, the user can safely supply power by replacing the power supply apparatus 130 with a different power supply apparatus trusted by the USB-IF, for example.

Figure 11C:
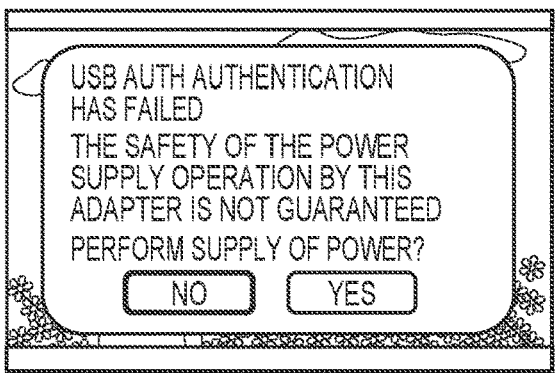

At the screen of FIG. 11B or FIG. 11C, when the user selects "yes" or "no" via the operation unit 207, the process proceeds to step S1003.

In step S1002, the control unit 250 performs second display control to display second information. For example, the control unit 250 displays on the display unit 208 information indicating that the power supply apparatus 130 has not passed the compliance test of the USB standard (that the second authentication process is a failure). Also, the control unit 250 displays on the display unit 208 information prompting the user to select whether or not to perform power supply (receive the power P22) using the power supply apparatus 130.

Figure 11D:
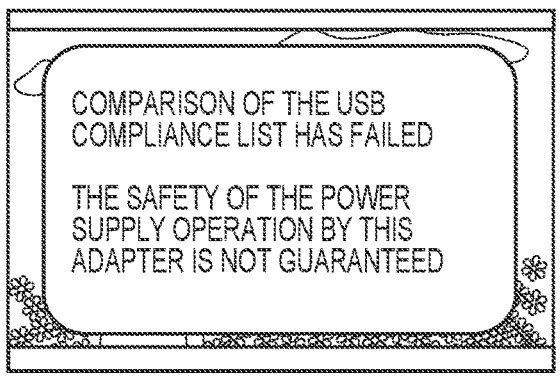

FIGS. 11D and 11B are diagrams illustrating display examples of the information in step S1002. First, as illustrated in FIG. 11D, the control unit 250 displays on the display unit 208 information indicating that the power supply apparatus 130 has not passed the compliance test of the USB standard (that the second authentication process is a failure). Then (for example, after a predetermined amount of time has elapsed), as illustrated in FIG. 11B, the control unit 250 displays on the display unit 208 information prompting the user to select whether or not to perform power supply (receive the power P22) using the power supply apparatus 130. Note that the method of displaying the information in step S1002 is not particularly limited, and the control unit 250 may display the information corresponding to FIG. 11D and the information corresponding to FIG. 11B together on one screen, as illustrated in FIG. 11E.

Via the information displayed in step S1002, the user can come to know that the second authentication process is a failure. Then, in responding to this information, the user can safely supply power by replacing the power supply apparatus 130 with a different power supply apparatus that has passed the compliance test, for example. Alternatively, in a case where the second authentication process may have been a failure due to the USB compliance list being old, the user may operate the power receiving apparatus 200 to update the USB compliance list.

Figure 11E:
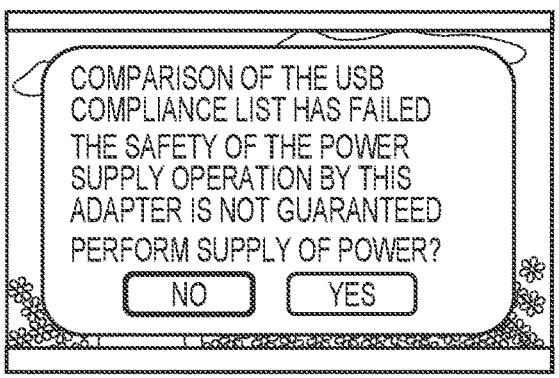

At the screen of FIG. 11B or FIG. 11E, when the user selects "yes" or "no" via the operation unit 207, the process proceeds to step S1003.

Figure 11F:
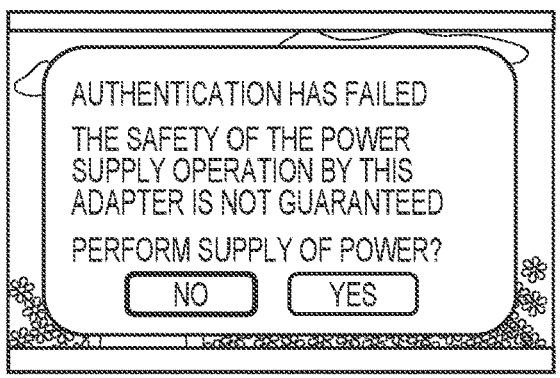

By displaying different information in step S1001 and step S1002 as described above, the user can come to know that the first authentication process or the second authentication process is a failure, further making clear the action to be taken to safely supply power. However, as illustrated in FIG. 11F, the control unit 250 may display the information as in step S1001 and step S1002, for example. Even in this case, the user can at least come to know that the first authentication process or the second authentication process is a failure.

In step S1003, the control unit 250 determines whether or not to supply power (receiving the power P22). In a case where the user selects "yes" in step S1001 or step S1002, the control unit 250 determines to supply power. In a case where the user selects "no" in step S1001 or step S1002, the control unit 250 determines to not supply power. In a case where power is supplied, the process proceeds to step S409. In a case where power is not supplied, the process proceeds to step S411.

In this manner, by the user operating to select "yes" (a user operation to select power supply) in response to the information (power supply selection information) prompting the user to select whether or not supply power displayed in step S1001 or step S1002, power can be supplied. Accordingly, even in a case where the first authentication process or the second authentication process is a failure, for example, the user can select to supply power if they are sure of the safety of the power supply apparatus 130 for some reason. As a result, the user-friendliness is improved. Note that the control unit 250 may display the information (power supply selection information) prompting the user to select whether or not to supply power in step S1001 or step S1002.

In step S1004, the control unit 250 displays on the display unit 208 information indicating that both the first authentication process and the second authentication process are successful.

Figure 11G:
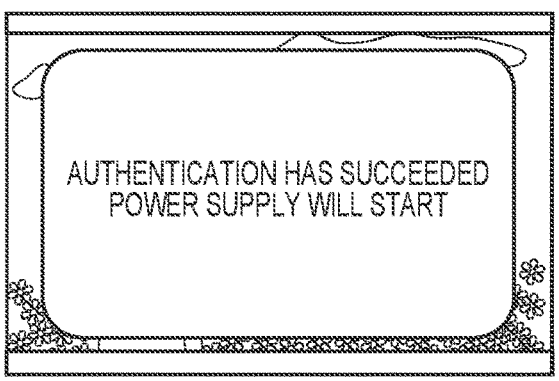

FIG. 11G is a diagram illustrating a display example of the information in step S1004. Via the information displayed as illustrated in FIG. 11G, the user can come to clearly know that both the first authentication process and the second authentication process are successful. However, the process of step S1004 may be omitted. Even in this case, the user can come to know that the first authentication process or the second authentication process are successful via the information displayed in step S1001 or step S1002.

As described above, according to the fourth embodiment, the power receiving apparatus 200 obtains a certificate including an XID from the power supply apparatus 130 using the USB AUTH standard and determines whether or not the certificate is authentic (the first authentication process). Also, the power receiving apparatus 200 determines whether or not the power supply apparatus 130 has passed the compliance test of the USB standard based on the XID (the second authentication process).

Also, the power receiving apparatus 200 displays information (a message) when the first authentication process or the second authentication process is a failure. In this manner, the user can easily come to know that the first authentication process or the second authentication process is a failure.

Fifth Embodiment

At least one of the various functions, processes, and methods of the embodiments described above can be implemented using a program. In a fifth embodiment described below, a program for implementing at least one of the various functions, processes, and methods of the embodiments described above is referred to as "program X". Furthermore, in the fifth embodiment, a computer for executing the program X is referred to as "computer Y". Examples of the computer Y include a personal computer, a microcomputer, a central processing unit (CPU), or the like.

At least one of the various functions, processes, and methods of the embodiments described above can be implemented by the computer Y executing the program X. In this case, the program X is supplied to the computer Y via a computer-readable storage medium. The computer-readable storage medium of the fifth embodiment includes at least one of a hard disk apparatus, a magnetic storage apparatus, an optical storage apparatus, a magneto-optical storage apparatus, a memory card, ROM, RAM, or the like. Furthermore, the computer-readable storage medium of the fifth embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application Nos. 2020-082812, 2020-082813, 2020-082814, and 2020-082815, filed May 8, 2020, which are hereby incorporated by reference herein in their entireties.

What is claimed is:
1. A power receiving apparatus comprising:
a connector;
a CPU; and a memory that stores a program which, when executed by the CPU, causes the power receiving apparatus to function as:

a power receiving unit that receives a first power from a power supply apparatus connected to the connector;

a communication unit that communicate with the power supply apparatus via the connector; and a control unit that determines whether or not the power supply apparatus connected to the connector supports a Universal Serial Bus (USB) Power Delivery standard, wherein the control unit controls the communication unit to receive authentication information, which is based on a USB Authentication standard, including identification information of the power supply apparatus connected to the connector and performs a first process for determining whether or not the authentication information received from the power supply apparatus is authentic in a case where it is determined that the power supply apparatus connected to the connector supports the USB Power Delivery standard, wherein the control unit performs a second process for determining whether or not the power supply apparatus connected to the connector has passed a compliance test of a USB standard based on the identification information included in the authentication information received from the power supply apparatus connected to the connector and compliance management information, which is stored in the memory, including identification information of a power supply apparatus which has been passed the compliance test in a case where it is determined that the authentication information received from the power supply apparatus is authentic by the first process, and wherein the control unit controls the power receiving unit in accordance with a determination result by the first process and a determination result by the second process to receive a second power greater than the first power, in a case where it is determined that the authentication information is authentic by the first process and it is determined that the power supply apparatus has passed the compliance test by the second process.

2. The power receiving apparatus according to claim 1, wherein the identification information in the compliance management information is associated with compliance information indicating pass/failure of the compliance test, and wherein the control unit determines that the power supply apparatus connected to the connector has passed the compliance test, in a case where the identification information of the power supply apparatus connected to the connector is included in the compliance management information and compliance information associated with the identification information of the power supply apparatus connected to the connector indicates a pass of the compliance test.

3. The power receiving apparatus according to claim 2, wherein the control unit determines that the power supply apparatus connected to the connector has not passed the compliance test, in a case where restrict power reception information is associated with the identification information of the power supply apparatus connected to the connector in the compliance management information, irrespective of the compliance information associated with the identification information of the power supply apparatus connected to the connector.

4. The power receiving apparatus according to claim 1, wherein the control unit controls the power receiving unit to stop receiving power from the power supply apparatus connected to the connector, in a case where it is determined that the authentication information is not authentic by the first process.

5. The power receiving apparatus according to claim 1, wherein the control unit controls the power receiving unit to receive a third power greater than the first power and less than the second power, in a case where it is determined that the authentication information is authentic by the first process and it is determined that the power supply apparatus has not passed the compliance test by the second process.

6. The power receiving apparatus according to claim 1, wherein the control unit controls the power receiving unit to receive a third power greater than the first power and less than the second power, in a case where it is determined that the authentication information is authentic by the first process.

7. The power receiving apparatus according to claim 1, wherein the connector includes a USB Type-C connector.

8. The power receiving apparatus according to claim 1, wherein the connector is capable of data communication based on a USB standard.

9. The power receiving apparatus according to claim 1, wherein the identification information is an XID of a USB standard.

10. A method comprising:

causing a power receiving unit to receive a first power from a power supply apparatus connected to a connector;

communicating, at a communication unit, with the power supply apparatus via the connector;

determining whether or not the power supply apparatus connected to the connector supports a Universal Serial Bus (USB) Power Delivery standard;

controlling the communication unit to receive authentication information, which is based on a USB Authentication standard, including identification information of the power supply apparatus connected to the connector and performing a first process for determining whether or not the authentication information received from the power supply apparatus is authentic in a case where it is determined that the power supply apparatus connected to the connector supports the USB Power Delivery standard;

performing a second process for determining whether or not the power supply apparatus connected to the connector has passed a compliance test of a USB standard based on the identification information included in the authentication information received from the power supply apparatus connected to the connector and compliance management information, which is stored in the memory, including identification information of a power supply apparatus which has been passed the compliance test in a case where it is determined that the authentication information received from the power supply apparatus is authentic by the first process; and controlling the power receiving unit in accordance with a determination result by the first process and a determination result by the second process to receive a second power greater than the first power, in a case where it is determined that in a case where the authentication information is authentic by the first process and it is determined that the power supply apparatus has passed the compliance test by the second process.

11. A non-transitory storage medium that stores a program causing a computer to perform a method, the method comprising:

causing a power receiving unit to receive a first power from a power supply apparatus connected to a connector;

communicating, at a communication unit, with the power supply apparatus via the connector;

determining whether or not the power supply apparatus connected to the connector supports a Universal Serial Bus (USB) Power Delivery standard;

controlling the communication unit to receive authentication information, which is based on a USB Authentication standard, including identification information of the power supply apparatus connected to the connector and performing a first process for determining whether or not the authentication information received from the power supply apparatus is authentic in a case where it is determined that the power supply apparatus connected to the connector supports the USB Power Delivery standard;

performing a second process for determining whether or not the power supply apparatus connected to the connector has passed a compliance test of a USB standard based on the identification information included in the authentication information received from the power supply apparatus connected to the connector and compliance management information, which is stored in the memory, including identification information of a power supply apparatus which has been passed the compliance test in a case where it is determined that the authentication information received from the power supply apparatus is authentic by the first process; and controlling the power receiving unit in accordance with a determination result by the first process and a determination result by the second process to receive a second power greater than the first power, in a case where it is determined that in a case where the authentication information is authentic by the first process and it is determined that the power supply apparatus has passed the compliance test by the second process.

* * * * *